United States Patent
Mitomo et al.

(10) Patent No.: US 7,313,818 B2
(45) Date of Patent: Dec. 25, 2007

(54) DEVICE, METHOD AND PROGRAM FOR DETECTING UNAUTHORIZED ACCESS

(75) Inventors: Masashi Mitomo, Kawasaki (JP); Yoshiki Higashikado, Kawasaki (JP); Fumie Takizawa, Kawasaki (JP); Satoru Torii, Kawasaki (JP); Osamu Koyano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 817 days.

(21) Appl. No.: 10/822,558

(22) Filed: Apr. 12, 2004

(65) Prior Publication Data

US 2005/0091513 A1    Apr. 28, 2005

(30) Foreign Application Priority Data

Oct. 28, 2003    (JP)    ............... 2003-368063

(51) Int. Cl.
*G06F 15/16*    (2006.01)
(52) U.S. Cl. ................ 726/13; 726/3; 726/4
(58) Field of Classification Search ............ 726/13, 726/3, 4
See application file for complete search history.

(56) References Cited

FOREIGN PATENT DOCUMENTS

WO    WO 03/067810    8/2003

OTHER PUBLICATIONS

StackPi: New Packet Marking and Filtering Mechanisms for DDoS and IP Spoofing Defense Yaar, A.; Perrig, A.; Song, D.; Selected Areas in Communications, IEEE Journal on vol. 24, Issue 10, Oct. 2006 pp. 1853-1863.*
Optimal filtering for denial of service mitigation Stephan, B.; Decision and Control, 2002, Proceedings of the 41st IEEE Conference on vol. 2, Dec. 10-13, 2002 pp. 1428-1433 vol. 2.*
IP traceback marking scheme based packets filtering mechanism Ping, S.Y.; Lee Moonchuen; IP Operations and Management, 2004. Proceedings IEEE Workshop on Oct. 11-13, 2004 pp. 253-260.*
Osamu Koyano; "Research and development on a technique for protecting against distributed denial of service (DDoS) attacks"; May 31, 2003; Internet retrieval date: Apr. 24, 2007; <URL http://www2.nict.go.jp/tao/kenkyu/itakua/seika/45/45fujitsu.pdf.

(Continued)

*Primary Examiner*—David Jung
(74) *Attorney, Agent, or Firm*—Greer, Burns, & Crain, Ltd.

(57) ABSTRACT

An unauthorized access detection device capable of detecting unauthorized accesses which are made through preparation, in real time. When a packet travels on a network, a key data extractor obtains the packet and obtains key data. Next an ongoing scenario detector searches an ongoing scenario storage unit for an ongoing scenario with the key data as search keys. A check unit determines whether the execution of the process indicated by the packet after the ongoing scenario detected by the ongoing scenario detector follows an unauthorized access scenario being stored in an unauthorized access scenario storage unit. Then a report output unit outputs an unauthorized access report depending on the check result of the check unit.

11 Claims, 23 Drawing Sheets

OTHER PUBLICATIONS

Mitomo et al; "Method for detecting omen of DDoS with attack models"; Proceedings of the 65th national convention of IPSJ (information processing society of Japan); vol. 3, pp. 207-208; Mar. 2003.

Mitomo et al.; Development of DDoS attack forecast system; IPSJ (information processing society of Japan); Symposium series; vol. 2003, No. 15, pp. 97-102; Oct. 2003.

Mitomo et al. "Development of DdoS Attack Forecast System," Computer Security Symposium 2003, Oct. 2003 (with translation).

* cited by examiner

FIG. 7

132 ONGOING SCENARIO DB

| PAIRS OF SOURCE IP ADDRESS AND DESTINATION IP ADDRESS | NAME OF UNAUTHORIZED ACCESS SCENARIO | DEGREE OF PROGRESS |
|---|---|---|
| 192.168.1.5→10.10.100.100 | UNAUTHORIZED ACCESS SCENARIO B | SECOND STAGE |
| 10.1.1.123→192.168.30.30 | UNAUTHORIZED ACCESS SCENARIO D | THIRD STAGE |
| ... | ... | ... |

332 ROLE SPECIFYING ONGOING SCENARIO DB

| ROLE-SPECIFIED IP ADDRESSES | | NAME OF UNAUTHORIZED ACCESS SCENARIO | DEGREE OF PROGRESS |
|---|---|---|---|
| 192.168.1.5 | AGENT | UNAUTHORIZED ACCESS SCENARIO B | SECOND STAGE |
| 10.10.100.100 | HANDLER | | |
| 10.1.1.123 | ATTACKER | UNAUTHORIZED ACCESS SCENARIO D | THIRD STAGE |
| 192.168.30.30 | TARGET | | |
| ..... | | ..... | ..... |

FIG. 13

132a ONGOING SCENARIO DB

| PAIRS OF SOURCE IP ADDRESS AND DESTINATION IP ADDRESS | NAME OF UNAUTHORIZED ACCESS SCENARIO | TOTAL WEIGHT |
|---|---|---|
| 192.168.1.5→10.10.100.100 | UNAUTHORIZED ACCESS SCENARIO B | 6 |
| 10.1.1.123→192.168.30.30 | UNAUTHORIZED ACCESS SCENARIO D | 1 |
| ... | ... | ... |

FIG. 17

| COMMANDS TO HANDLER | COMMANDS TO AGENT | DESCRIPTION |
|---|---|---|
| msize | rsz | SET THE SIZE (BYTE) OF A UDP PACKET TO BE USED FOR FUTURE FLOOD WITH A PARAMETER |
| mtimer | bbb | SET THE LENGTH (SECONDS) OF FUTURE FLOOD WITH A PARAMETER |
| mping | png | CONFIRM WHETHER EACH AGENT IS ALIVE OR NOT |
| die | d1e | STOP ALL AGENTS |
| dos | aaa | SEND UDP FLOOD TO IP ADDRESS SPECIFIED BY PARAMETER |
| mdos | xyz | SEND UDP FLOOD TO IP ADDRESS SPECIFIED BY PARAMETER. A PLURALITY OF IP ADDRESS CAN BE SPECIFIED |

FIG. 20

640 PREDICATED IMPACT/MEASURE DEFINITION TABLE

| TIME TO IMPACT | POSSIBILITY OF IMPACT | SCALE OF IMPACT | PREVENTATIVE MEASURES |
|---|---|---|---|
| WITHIN 5 MINUTES | 70% | LARGE | INTERRUPT COMMUNICATION FOR ONE HOUR (BECAUSE OF VERY URGENT AND LARGE IMPACT) |
| WITHIN 1 HOUR | 10% | LARGE | |
| WITHIN ONE DAY | 10% | MEDIUM | |

650 PREDICATED IMPACT /MEASURE DEFINITION TABLE

| TIME TO IMPACT | POSSIBILITY OF IMPACT | SCALE OF IMPACT | PREVENTATIVE MEASURES |
|---|---|---|---|
| WITHIN 1 HOUR | 10% | MEDIUM | NOTIFY THE ADMINISTRATOR OF A HOST (ADMINISTRATIOR HOST) THAT PROBABLY LAUNCHES AN ATTACK, MONITOR COMMUNICATION FOR NEXT 3 DAYS, AND INTERRUPT, IF NECESSARY, THE COMMUNICATION (BECAUSE IMPACT DOES NOT OCCUR SOON) |
| WITHIN 1 DAY | 40% | LARGE | |
| WITHIN 3 DAYS | 30% | LARGE | |

FIG. 23

DEVICE, METHOD AND PROGRAM FOR DETECTING UNAUTHORIZED ACCESS

BACKGROUND OF THE INVENTION (1) Field of the Invention

This invention relates to a device, method and program for detecting unauthorized accesses, and more particularly, to a device, method and program for detecting unauthorized accesses with attack models.

(2) Description of the Related Art

With development of information communication techniques, more services are offered over the Internet. For example, service providers install servers which are accessible over the Internet. With the servers, various services are provided to client computers over the Internet.

Since the servers offering services are accessible over the Internet, they are vulnerable to attack by unauthorized accesses. Therefore, we need some protections including detection of such unauthorized accesses at an early stage.

Basically, unauthorized accesses can be detected by detecting access requests including commands which are for illicit purposes. Specifically, in general, a list of unauthorized commands indicative of attacks against well-known security holes is previously registered. When an access request including an unauthorized command being listed is detected, this access request is rejected and an administrator is informed of this detection of the unauthorized access.

For example, "phf" is a well-known script having weakness (security hole). "Phf" is a script executable on web servers. By sending a prescribed hypertext transfer protocol (HTTP) request to a web server running the "phf" script, an unauthorized user can get a password file. Such HTTP request sent by the unauthorized user includes a character string "phf" specifying the script. Therefore, HTTP requests including the character string "phf" can be identified as unauthorized accesses.

Some unauthorized accesses, however, are made by using a plurality of normal commands together with unauthorized commands. For example, unauthorized accesses may be allowed by sending commands to a server based on the following steps.

1. [Ping_sweep]: An attacker obtains the Internet protocol (IP) address of an active machine with a network tool "ping," as the first stage of an attack.
2. [Port_scan]: The attacker scans every port of the active machine (to detect whether the transmission control protocol (TCP) port answers). In this step, the attacker can know the type of services being offered by the machine.
3. [Fingerprinting]: The attacker sends prescribed packets to a port to know, based on its responses, the type and version of the software of the server.
4. [Hijacking]: The attacker takes over the machine by using its weakness if he/she finds the weakness based on the type and version of the software running on the server (to cause the machine to execute a desired program).
5. [Deploy_Back_door]: The attacker installs a back door program into the machine that he/she is taking over. The back door program is a tool allowing the attacker to easily operate the machine as desired.

The check of commands included in each access request is not enough to detect such unauthorized accesses. Therefore, attack models are registered, which are state transitions indicating preparation of attacks. Then an unauthorized access is detected by relating events to each other to create a sequence of the events and comparing the sequence with the attack models (for example, refer to the third volume of the proceedings of the 65th national convention of information processing society of Japan, p. 207-208, "Method for detecting omen of DDoS with attack models" Masashi Mitomo et al.).

The conventional technique, however, causes overloads in processing of a server handling a great number of events. That is, in the conventional technique, when an event sequence is input in real time, "previous event logs" being stored are compared with the attack modes to detect an unauthorized access. In this case, every time when one event is input, the event logs should be all checked to see if a corresponding event transition appears in the attack models. As a result, unauthorized accesses could not be detected in real time if a great number of event logs are stored due to long operation.

SUMMARY OF THE INVENTION

In view of the foregoing, an object of this invention is to provide a device, method and program for detecting in real time unauthorized accesses which are made through preparation.

To accomplish the above object, there provided an unauthorized access detection device for detecting unauthorized accesses over a network. This unauthorized access detection device comprises: an unauthorized access scenario memory for storing unauthorized access scenarios each defining a procedure of processes to be executed over the network until an unauthorized access is made through preparation; an ongoing scenario memory for storing ongoing scenarios by relating the ongoing scenarios to key data, each ongoing scenario indicating the progress of processes executed over the network based on an unauthorized access scenario, the key data differentiating processes associated with a corresponding ongoing scenario from the other processes; a key data extractor for obtaining a packet traveling on the network and extracting the key data from the obtained packet; an ongoing scenario detector for retrieving an ongoing scenario from the ongoing scenario memory with the key data extracted by the key data extractor as a search key; a check unit for determining whether the execution of the process indicated by the packet after the ongoing scenario detected by the ongoing scenario detector follows an unauthorized access scenario being stored in the unauthorized access scenario memory; an ongoing scenario update unit for updating the ongoing scenario being stored in the ongoing scenario memory when the check unit obtains such a result that the execution follows the unauthorized access scenario; and a report output unit for outputting an unauthorized access report showing the progress of the processes executed based on the unauthorized access scenario, depending on the check result of the check unit.

Further, to accomplish the above objects, there provided an unauthorized access detection method for detecting unauthorized accesses over a network. This unauthorized access detection method comprises the steps of: obtaining a packet traveling on the network and extracting prescribed key data from the obtained packet; retrieving an ongoing scenario from an ongoing scenario memory with the key data extracted from the packet as a search key, the ongoing scenario indicating the progress of processes executed over the network based on an unauthorized access scenario defining a procedure of processes to be executed over the network until an unauthorized access is made through preparation, the key data differentiating processes associated with the ongoing scenario from other processes; checking unauthorized access scenario memory storing the unauthorized access scenario to determine whether the execution of the process indicated by the packet after the retrieved ongoing scenario follows the unauthorized access scenario; updating the ongoing scenario being stored in the ongoing scenario memory when a check result shows that the execution follows the unauthorized access scenario; and outputting an unauthorized access report indicating the progress of the processes executed based on the unauthorized access scenario, depending on the check result.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 7 shows an example of a data structure of an ongoing scenario DB;

FIG. 13 shows an example of a data structure of a role specifying ongoing scenario DB;

FIG. 17 shows an example of a data structure of an ongoing scenario DB of the fifth embodiment;

FIG. 20 shows setting command for "Trinoo";

FIG. 23 shows an example of a predicted impact/measure definition table for a "config_waiting" state.

DESCRIPTION OF THE PREFERRED EMBODIMENTS

Hereinafter, preferred embodiments of the present invention will be described in detail with reference to attached drawings.

The following description will first outline the invention and then give a more specific explanation for how the invention will be implemented.

Figure 1:
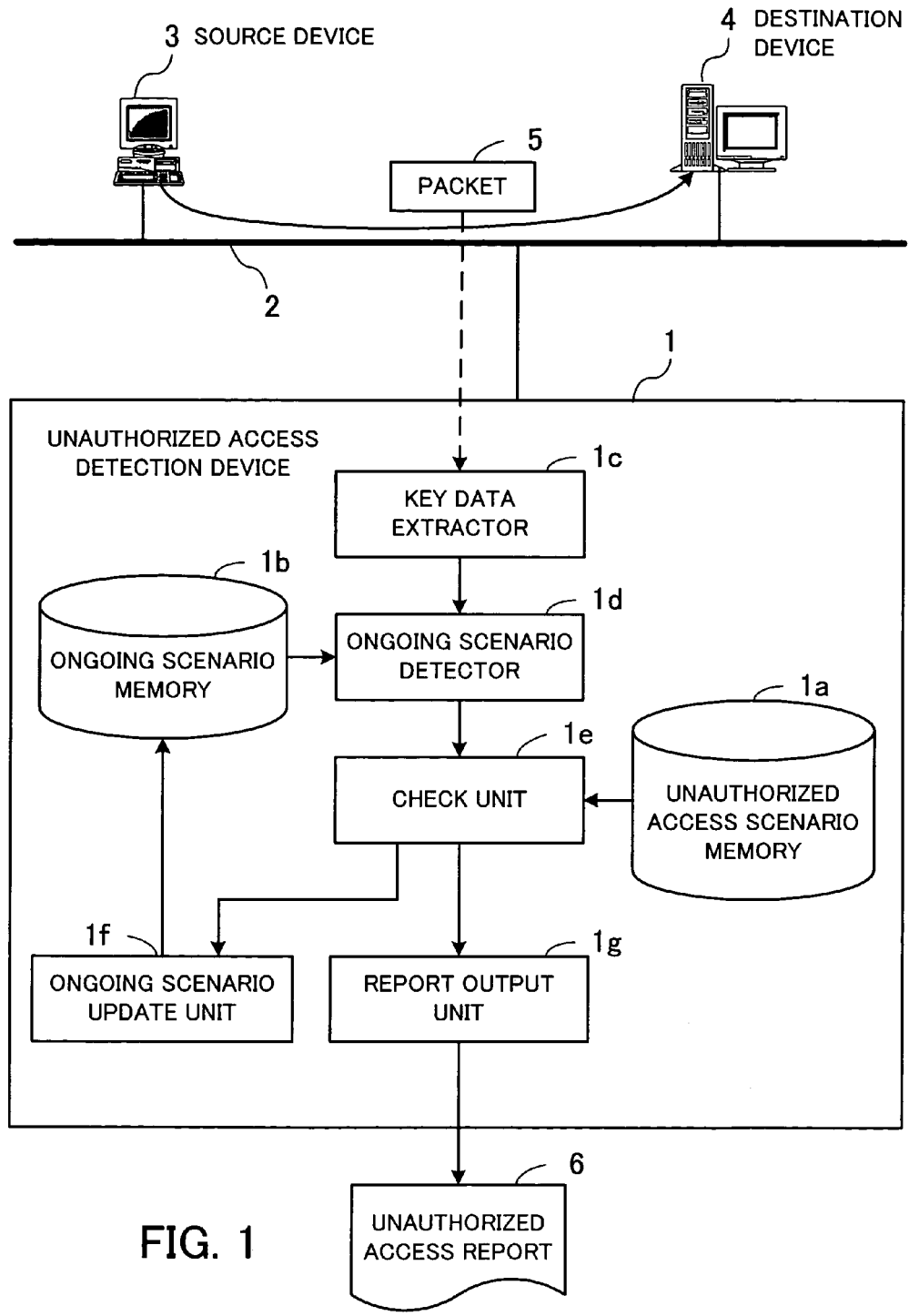
FIG. 1 shows the concept of the present invention which is applied to this embodiment.

FIG. 1 shows the concept of this invention which is applied to this embodiment. An unauthorized access detection device 1 detects unauthorized accesses over a network 2. As shown in FIG. 1, this unauthorized access detection device 1 is composed of an unauthorized access scenario memory 1a, an ongoing scenario memory 1b, a key data extractor 1c, an ongoing scenario detector 1d, a check unit 1e, an ongoing scenario update unit 1f, and a report output unit 1g.

The unauthorized access scenario memory 1a stores unauthorized access scenarios. An unauthorized access scenario defines a procedure of processes which are conducted via the network 2 until an unauthorized access is made through preparation. For example, in the unauthorized access scenario, a procedure of processes which are conducted until an unauthorized access is made through preparation can be defined in the form of transitions of events which happen in response to instructions and answers of processes made via the network 2.

The ongoing scenario memory 1b stores ongoing scenarios and key data in a relational structure, the ongoing scenarios indicating processes conducted via the network 2 based on unauthorized access scenarios, the key data distinguishing processes associated with a corresponding ongoing scenario from the other processes. The key data are the source address and the destination address of a packet 5, for example.

The key data extractor 1c obtains the packet 5 traveling over the network 2 and extracts key data from the obtained packet 5. For example, the address of a source device 3 and the address of a destination device 4 are extracted from a packet sent from the source device 3 to the destination device 4.

The ongoing scenario detector 1d retrieves an ongoing scenario from the ongoing scenario memory 1b with key data extracted by the key data extractor 1c as search keys. For example, an ongoing scenario including both the addresses of the source device 3 and the destination device 4 is retrieved.

The check unit 1e determines whether the execution of the process indicated by the packet 5 after the ongoing scenario retrieved by the ongoing scenario detector 1d follows an unauthorized access scenario being stored in the unauthorized access memory 1a.

The ongoing scenario update unit 1f updates the ongoing scenario being stored in the ongoing scenario memory 1b when the check unit 1e obtains such a result that the execution follows the unauthorized access scenario.

The report output unit 1g outputs an authorized access report 6 indicating the progress of processes executed based on the unauthorized access scenario, based on the check result of the check unit 1e. For example, the report output unit 1g outputs the unauthorized access report 6 when the ongoing scenario retrieved by the ongoing scenario detector 1d reaches the final stage of an unauthorized access scenario.

In such an unauthorized access detection device, when a packet 5 is sent over the network 2, the key data extractor 1c obtains this packet 5 and extracts key data. Then the ongoing scenario detector 1*d* retrieves an ongoing scenario from the ongoing scenario memory 1*b* with the key data, which is extracted by the key data extractor 1*c*, as search keys. Then the check unit 1*e* checks whether the execution of the process indicated by the packet 5 after the ongoing scenario retrieved by the ongoing scenario detector 1*d* follows an unauthorized access scenario being stored in the unauthorized access scenario memory 1*a*. When the check result of the check unit 1*e* shows that the execution follows the unauthorized access scenario, the ongoing scenario update unit 1*f* updates the ongoing scenario being stored in the ongoing scenario memory 1*b*. In addition, the report output unit 1*g* outputs an unauthorized access report 6 indicating the progress of processes executed based on the unauthorized access scenario, depending on the check result of the check unit 1*e*.

As described above, in this invention, ongoing scenarios are stored as a database by using key data as a key, instead of storing event logs. The key data is information which is associated with all events composing an unauthorized access scenario defined in the unauthorized access scenario memory 1*a* (for example, source address and destination address).

Therefore, based on key data extracted from a packet input in real time, an ongoing scenario associated with the key data can be specified in real time. In addition, only an ongoing scenario detected based on the key data is sufficient to be compared with the unauthorized access scenarios being stored in the unauthorized access scenario memory 1*a*. Therefore, a processing time can be shortened, thus making it possible to detect unauthorized accesses in real time.

It should be noted that the ongoing scenario memory 1*b* is able to store numeric values each indicating the degree of progress of an ongoing scenario, by relating it to the ongoing scenario. In this case, the ongoing scenario update unit If updates an ongoing scenario by increasing the numeric value of the degree of progress.

In addition, the report output unit 1*g* is able to output an unauthorized access report when a numeric value of the degree of progress exceeds a prescribed value. In this case, the report output unit 1*g* outputs an unauthorized access report 6 when the degree of progress of an ongoing scenario reaches a certain degree of progress, even the ongoing scenario does not reach the final stage of an unauthorized access scenario. By doing so, an unauthorized access report can be output when a sign of an unauthorized access appears.

Further, in an unauthorized access scenario of the unauthorized access scenario memory 1*a*, roles can be set to the source and destination of information (for example, packet) indicating a process to be conducted via the network 2. In this case, the check unit 1*e* determines whether the source and destination of the process indicated by the packet are taking their roles defined in the unauthorized access scenario. That is, it can be determined that an ongoing scenario progresses only when a packet indicates a process with matching roles. With this method, an unauthorized access made by three or more devices having different roles can be detected.

Furthermore, in an unauthorized access scenario, a procedure of processes which are conducted until an unauthorized access is made through preparation can be defined in the form of state transitions using events which happen via the network 2 in response to instructions and responses of processes as turning points. In this case, the check unit 1*e* determines whether a state transition based on the event of the process indicated by a packet 5 follows an unauthorized access scenario. With this method, the progress of preparation of an unauthorized access can be grasped even if a plurality of events are intricately intertwined with each other until the attack starts.

Still further, in an unauthorized access scenario, a valid period from a process to a next stage can be set. In this case, the check unit 1*e* determines whether the process indicated by a packet 5 is performed within a valid period. That is, the check unit 1*e* determines that an ongoing scenario progresses only when the process of a next stage is executed within a valid period. This method can avoid outputting of an unauthorized access report by mistake, for an ongoing scenario which was abandoned in the middle of preparation.

In this method, the ongoing scenario update unit 1*f* is able to delete ongoing scenarios of which the valid periods have expired, from the ongoing scenario memory 1*b*. Thus unnecessary ongoing scenario abandoned can be deleted effectively.

Furthermore, in the unauthorized access scenario, weights which are added every time when a scenario progresses can be defined. In this case, the report output unit 1*g* outputs an unauthorized access report 6 when the total weight exceeds a prescribed value. With this method, a sign of an attack can be detected when the possibility of an unauthorized access gets higher, so that an unauthorized access report 6 can be output before the attack.

Furthermore, the check unit 1*e* is able to predict the type, extent and period of damages based on an unauthorized access scenario which probably happens. Thus appropriate measures can be taken against the unauthorized access, based on the predictions.

Furthermore, damages based on an unauthorized access scenario which probably happens can be predicated by obtaining, over the network 2, and analyzing information on the devices and the network being involved in the unauthorized access scenario.

Hereinafter, one embodiment of this invention will be described in detail.

First Embodiment

Now the first embodiment will be described.

Figure 2:
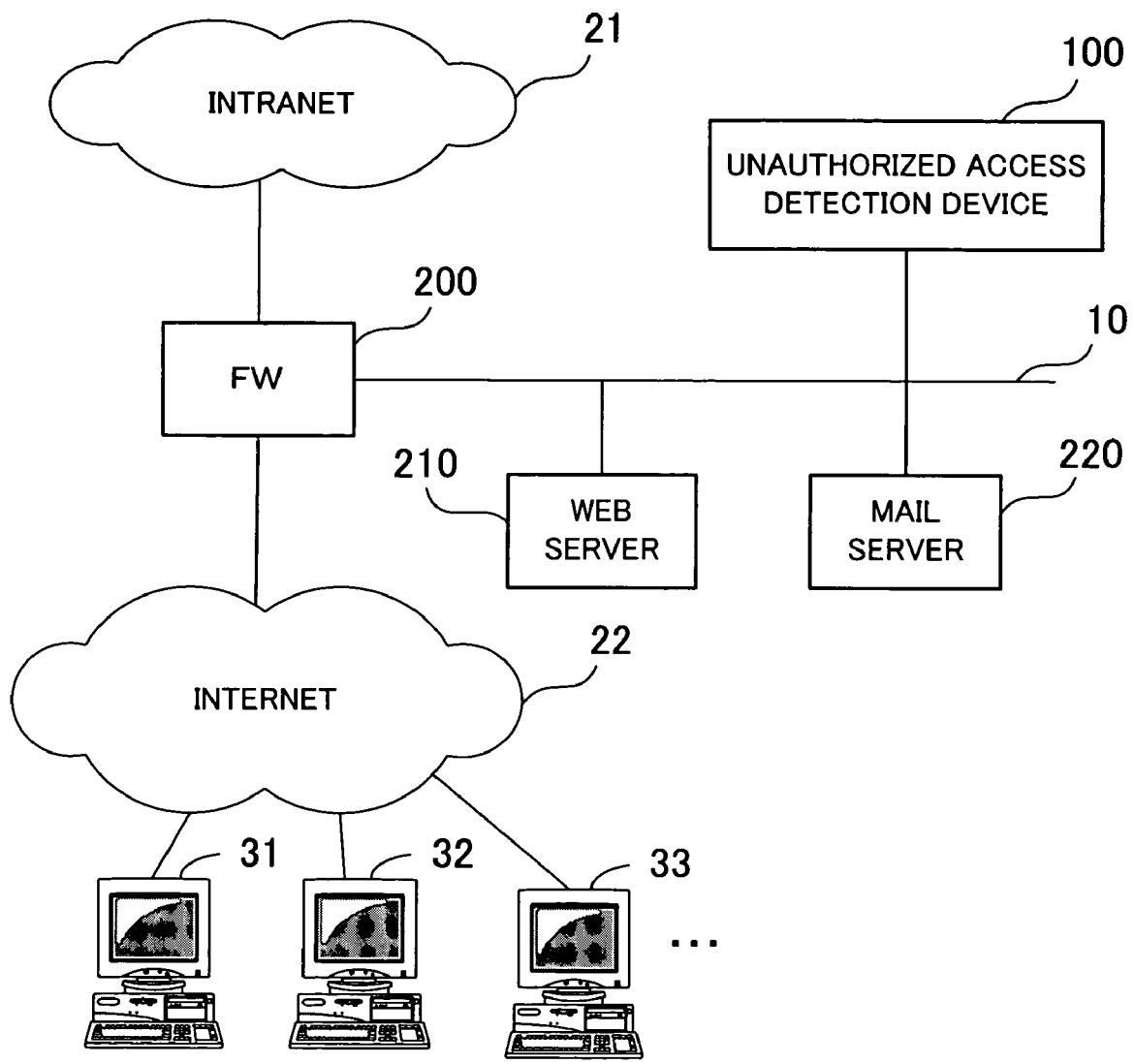
FIG. 2 shows an example of a structure of a network system according to the first embodiment.

FIG. 2 shows an example of a structure of a network system according to the first embodiment. Referring to FIG. 2, a firewall (FW) 200 is installed between an intranet 21 and the Internet 22. The firewall 200 is connected to a network 10.

The network 10 is a network accessible from clients 31, 32, 33, . . . being connected to the Internet 22. Connected to the network 10 are an unauthorized access detection device 100, a web server 210, and a mail server 220. The web server 210 is a computer which offers service to provide content such as web pages over the Internet 22. The mail server 220 is a server computer which offers service to transmit and receive electronic mails over the intranet 21 and the Internet 22.

The unauthorized access detection device 100 is a computer which monitors unauthorized accesses to devices on the network 10 over the Internet 22 with a function such as an intrusion detection system (IDS). That is, the web server 210 and the mail server 220 open their IP addresses to the public to offer their services over the Internet 22. Therefore, the web server 210 and the mail server 220 are vulnerable to attacks by unauthorized accesses. The unauthorized access detection device 100 monitors packets traveling on the network 10 to detect unauthorized accesses to the web server 210 and the mail server 220.

Figure 3:
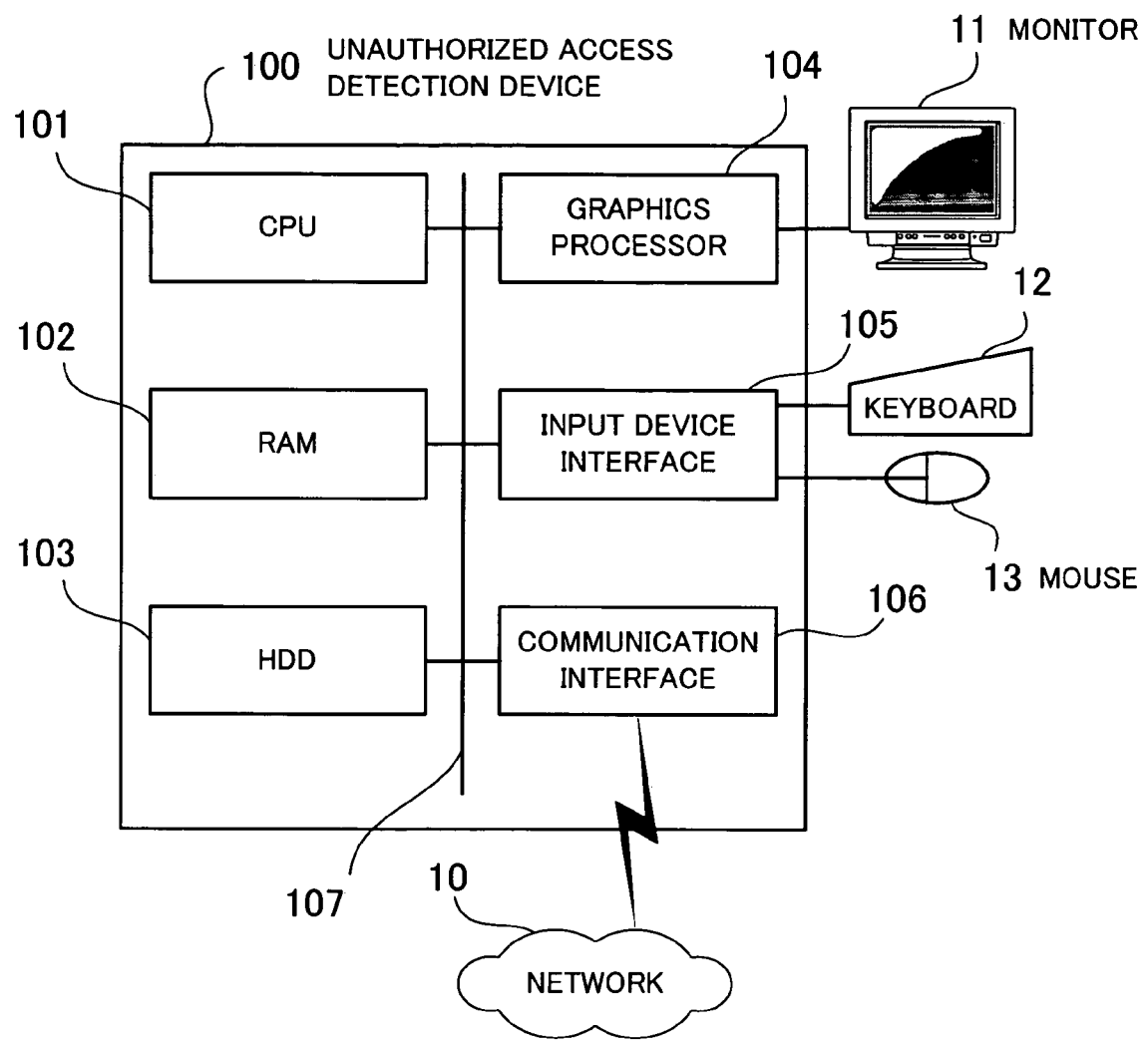
FIG. 3 shows an example of a hardware structure of an unauthorized access detection device according to the embodiment of this invention.

FIG. 3 shows an example of a hardware structure of the unauthorized access detection device according to this embodiment of this invention. This unauthorized access detection device 100 is entirely controlled by a central processing unit (CPU) 101. Connected to the CPU 101 are a random access memory (RAM) 102, a hard disk drive (HDD) 103, a graphics processor 104, an input device interface 105 and a communication interface 106 via bus 107.

The RAM 102 temporarily stores at least a part of an operating system (OS) program and application programs which are executed by the CPU 101. The RAM 102 stores various kinds of data required for CPU processing. The HDD 103 stores the OS and application programs.

The graphics processor 104 is connected to a monitor 11 to display images on the monitor 11 under the control of the CPU 101. The input device interface 105 is connected to a keyboard 12 and a mouse 13. The input device interface 105 transfers signals from the keyboard 12 and the mouse 13 to the CPU 101 via the bus 107.

The communication interface 106 is connected to the network 10 to communicate data with other computers over the network 10.

With such the hardware structure, the processing functions of the first embodiment can be realized. It should be noted that FIG. 3 shows the hardware structure of the unauthorized access detection device 100 and this structure can be also applied to the firewall 200, the web server 210, the mail server 220 and the clients 31, 32, 33, . . . .

Figure 4:
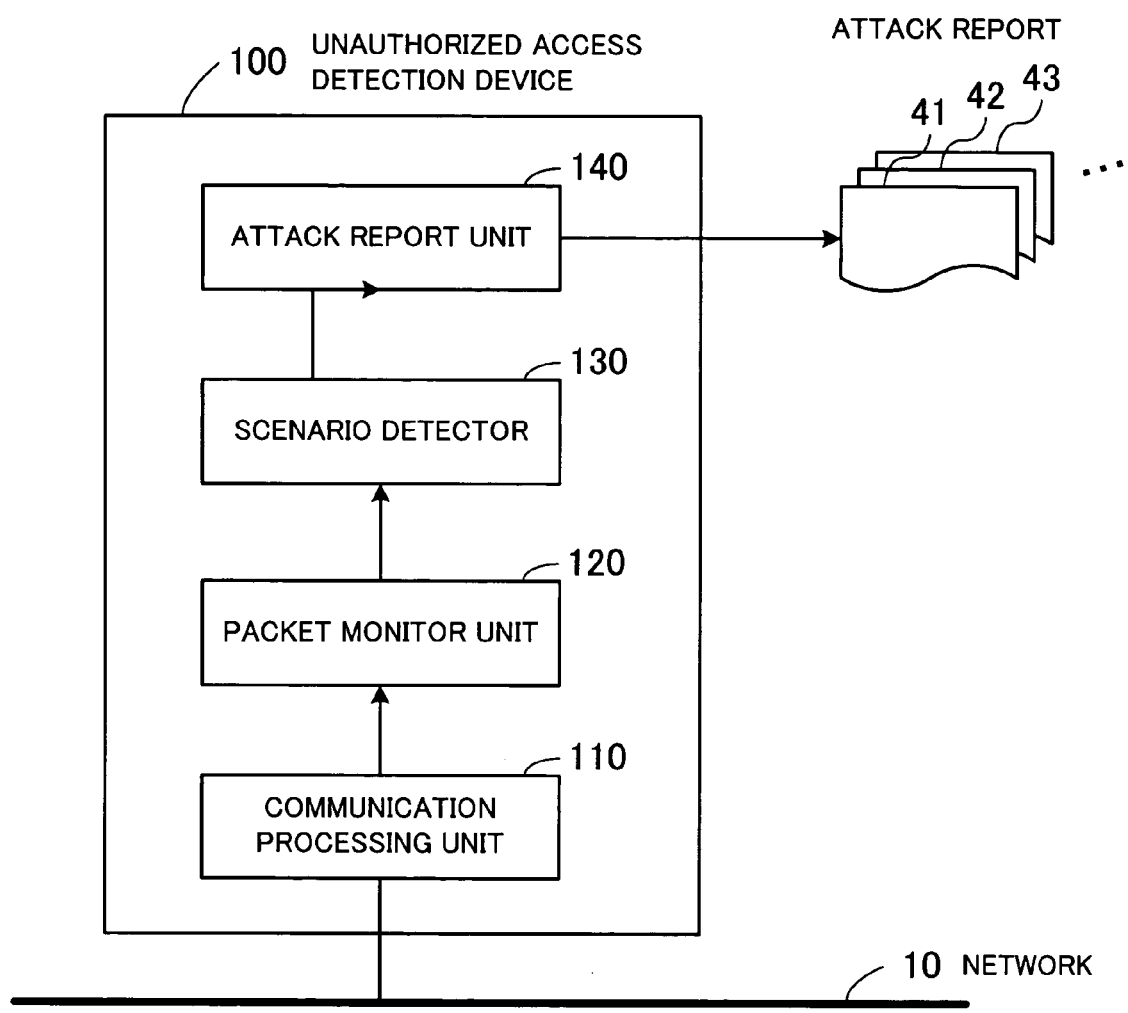
FIG. 4 is a block diagrams showing an internal structure of the unauthorized access detection device according to the first embodiment.

FIG. 4 is a block diagram showing an internal structure of the unauthorized access detection device according to the first embodiment. This unauthorized access detection device 100 is equipped with a communication processing unit 110, a packet monitor unit 120, a scenario detector 130 and an attack report unit 140.

The communication processing unit 110 performs communication over the network 10. This communication processing unit 110 takes in not only packets going to the unauthorized access detection device 100 but also packets going to the web server 210 and mail server 220, and gives them to the packet monitor unit 120.

The packet monitor unit 120 detects the event of a packet by analyzing the packet traveling on the network 10. The packet monitor unit 120 gives the detected event to the scenario detector 130.

The scenario detector 130 detects an event transition to the event detected by the packet monitor unit 120, which is based on an unauthorized access scenario. Then the scenario detector 130 notifies the attack report unit 140 of the detected event transition as an unauthorized access report.

The attack report unit 140 creates an attack report 41, 42, 43, . . . , on the future attack prediction, based on the event transition detected by the scenario detector 130, and notifies an administrator of this report. As one notification method of the attack reports 41, 42, 43, . . . , the contents of the reports are displayed on the monitor of a terminal device the administrator uses. If reporting is not urgent, the attack reports 41, 42, 43, . . . are notified to the administrator via electronic mails.

With this structure, the communication processing unit 110 takes in a packet traveling on the network 10 and the packet monitor unit 120 detects an event. The detected event is given to the scenario detector 130 to be compared with unauthorized access scenarios. If an event transition based on an unauthorized access scenario is detected, the attack report unit 140 is notified of the contents of this event transition to output an attack report 41, 42, 43 . . . .

Next the scenario detector 130 will be described in detail.

Figure 5:
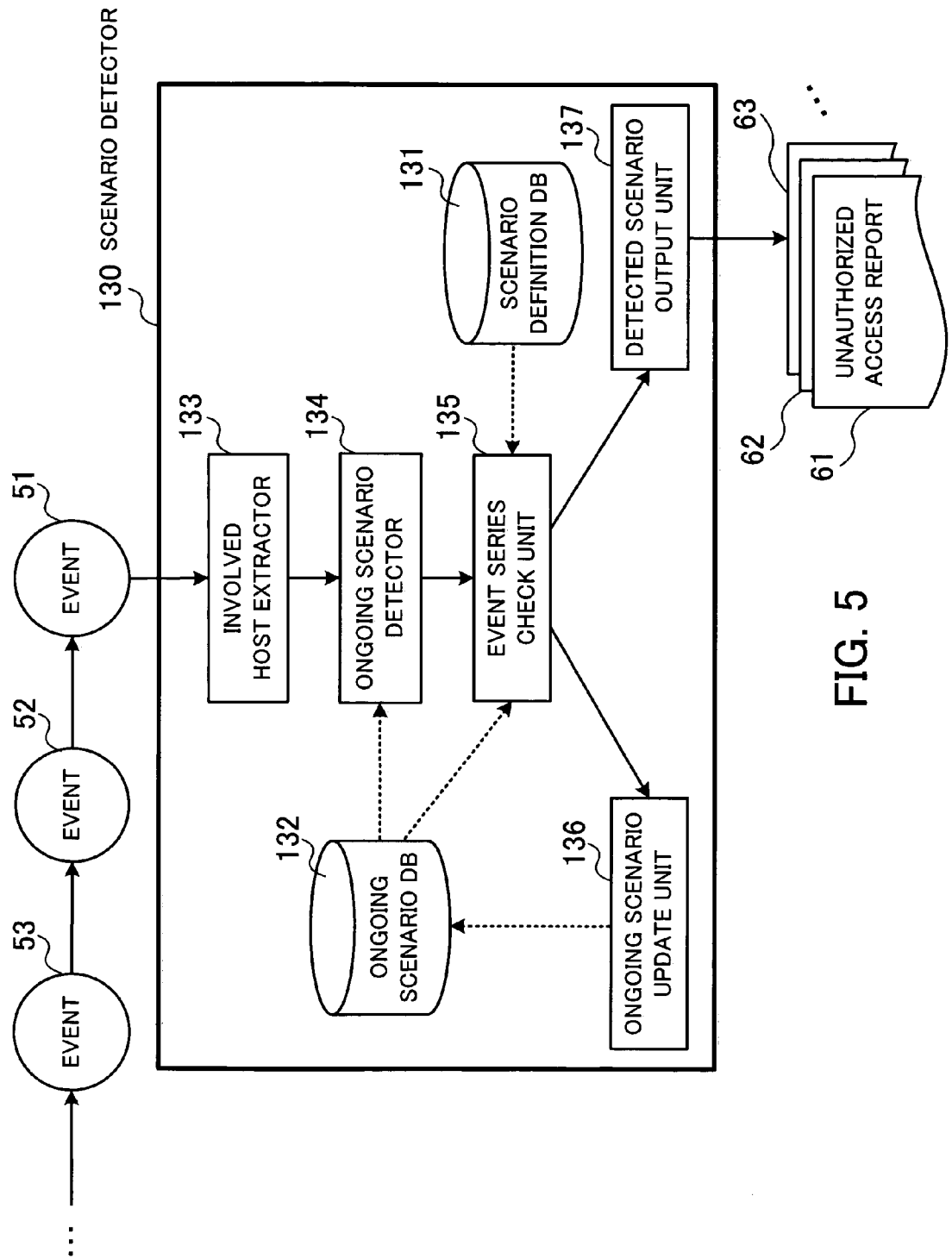
FIG. 5 is a functional block diagram of a scenario detector according to the first embodiment.

FIG. 5 is a functional block diagram showing the scenario detector of the first embodiment. The scenario detector 130 is equipped with a scenario definition database (DB) 131, an ongoing scenario DB 132, an involved host extractor 133, an ongoing scenario detector 134, an event series check unit 135, an ongoing scenario update unit 136 and a detected scenario output unit 137.

In FIG. 5, events 51, 52, 53, . . . are events which were detected by the packet monitor unit 120 in real time on the network 10. Each event 51, 52, 53, . . . includes information such as its name (event name), a source IP address, a destination IP address, and a detected time.

In this first embodiment, key data relating events to each other are a "source IP address" and a "destination IP address." In this connection, time may be used as key data.

The scenario definition DB 131 is a database storing unauthorized access scenarios predefined. Since many unauthorized accesses are made based on prescribed scenarios, the unauthorized access scenarios are represented in the form of event transitions in the scenario definition DB 131.

The ongoing scenario DB 132 is a database storing event transitions (ongoing events) which are associated with each other by key data. In the ongoing scenario DB 132, a source IP address, a destination IP address, the name of a corresponding unauthorized access scenario, and the degree of progress are registered for every ongoing scenario.

The involved host extractor 133 extracts the "source IP address" and "destination IP address" as key data, from the event 51, 52, 53, . . . input in real time.

The ongoing scenario detector 134 searches the ongoing scenario DB 132 for an ongoing scenario, with the "source IP address" and "destination IP address" extracted by the involved host extractor 133 as search keys. The detected ongoing scenario is given to the event series check unit 135.

The event series check unit 135 obtains "the name of an unauthorized access scenario and the "degree of progress" from an entry when the ongoing scenario detector 134 retrieves the entry from the ongoing scenario DB 132. The event series check unit 135 refers to the scenario definition DB 131 to determine based on the name of an event input whether a transition from the detected ongoing scenario to the input event follows the unauthorized access scenario. If the event follows the unauthorized access scenario, the ongoing scenario update unit 136 is notified of this matter.

In addition, when the scenario definition DB 131 has an event transition starting with the input event, the event series check unit 135 notifies the ongoing scenario update unit 136 of the start of the event transition. On the other hand, when the event transition after the ongoing scenario reaches the final stage of the unauthorized access scenario, the event series check unit 135 gives information on the ongoing scenario to the detected scenario output unit 137.

Upon notification of the event occurrence based on the scenario from the event series check unit 135, the ongoing scenario update unit 136 updates the "degrees of progress" of the corresponding entry in the ongoing scenario DB 132.

When an event being checked is the same as the first event of an entry in the scenario definition DB 131, the ongoing scenario update unit 136 adds a corresponding entry in the ongoing scenario DB 132.

When the event series check unit 135 determines that the event transition reaches the final stage of the unauthorized access scenario, the detected scenario output unit 137 confirms the unauthorized access and outputs the unauthorized access report 61, 62, 63, . . . to the outside. Each unauthorized access report 61, 62, 63, . . . includes information on the detected ongoing scenario (source IP address and destination IP address).

Figure 6:
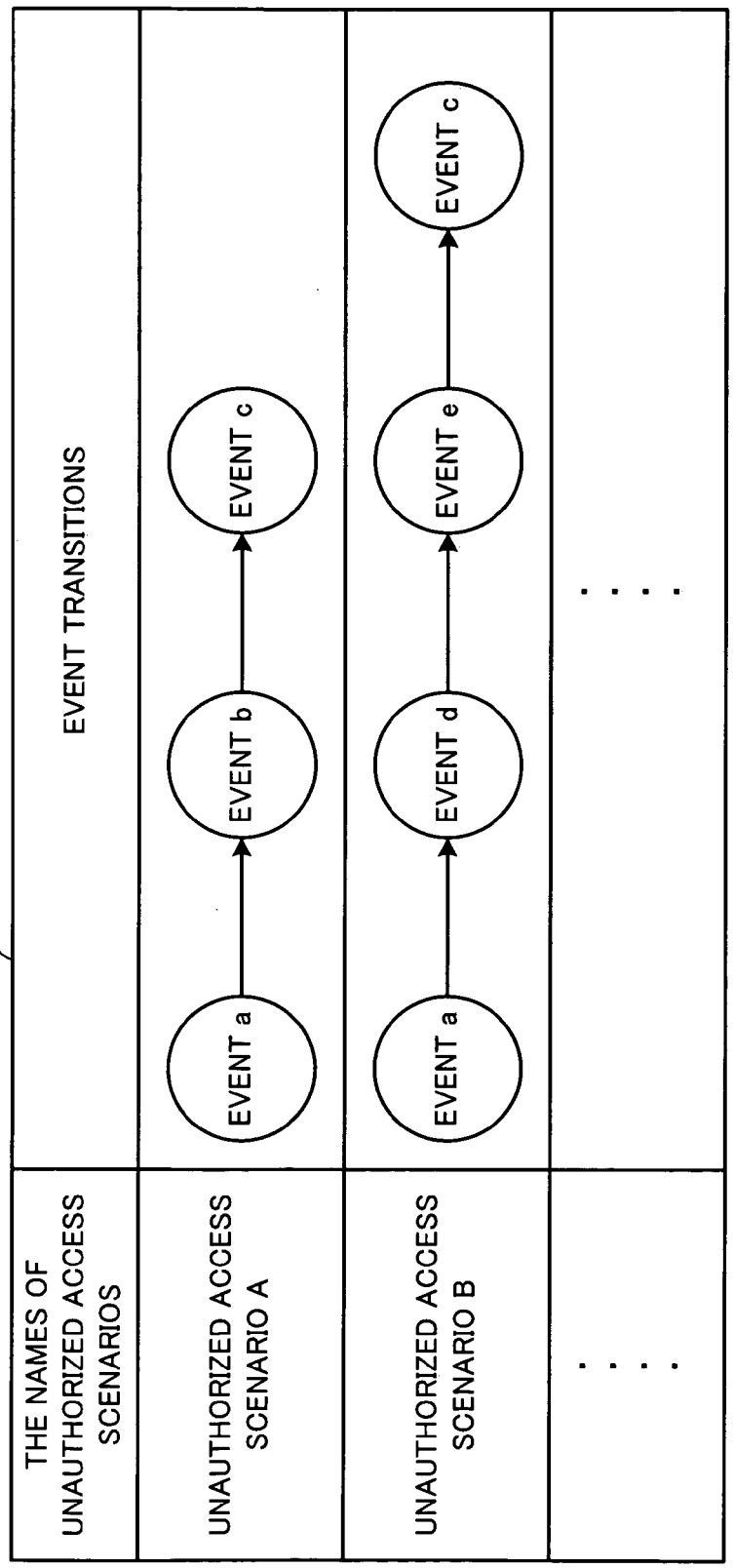
FIG. 6 shows an example of a data structure of a scenario definition database (DB)

FIG. 6 shows an example of a data structure of the scenario definition DB. In this scenario definition DB 131, event transitions showing how to make unauthorized accesses are registered by relating them to the names of unauthorized access scenarios. The event transitions are represented by arranging event names.

For example, an unauthorized access scenario A represents a scenario in which an event a, an event b, and then an event c happen in order. An unauthorized access scenario B represents a scenario in which the event a, an event d, an event e and then the event c happen in order.

When event transitions associated with each other by key data based on an unauthorized access scenario defined in the scenario definition DB 131 are created, it means that an unauthorized access is detected.

FIG. 7 shows an example of a data structure of the ongoing scenario DB. This ongoing scenario DB 132 stores a pair of source IP address and destination IP address the name of an unauthorized access scenario and the degree of progress in a relational structure, for every entry.

Each entry indicates the progress of an ongoing scenario in communication between devices. That is, with the "source IP address" and "destination IP address" of an ongoing scenario as key data (items to be detected), the entry keeps the name of an unauthorized access scenario and the degree of its progress by relating them to the key data. The degree of progress indicates the progress of a scenario, by which stage of the unauthorized access scenario the current event is in.

For example, an ongoing scenario between a device with a source IP address "192.168.1.5" and a device with a destination IP address "10.10.100.100" is in the second event of an unauthorized access scenario B. As another example, an ongoing scenario between a device with a source IP address "10.1.1.123" and a device with a destination IP address "192.168.30.30" is in the third event of an unauthorized access scenario D.

Such the scenario detector 130 performs a following scenario detection process.

Figure 8:
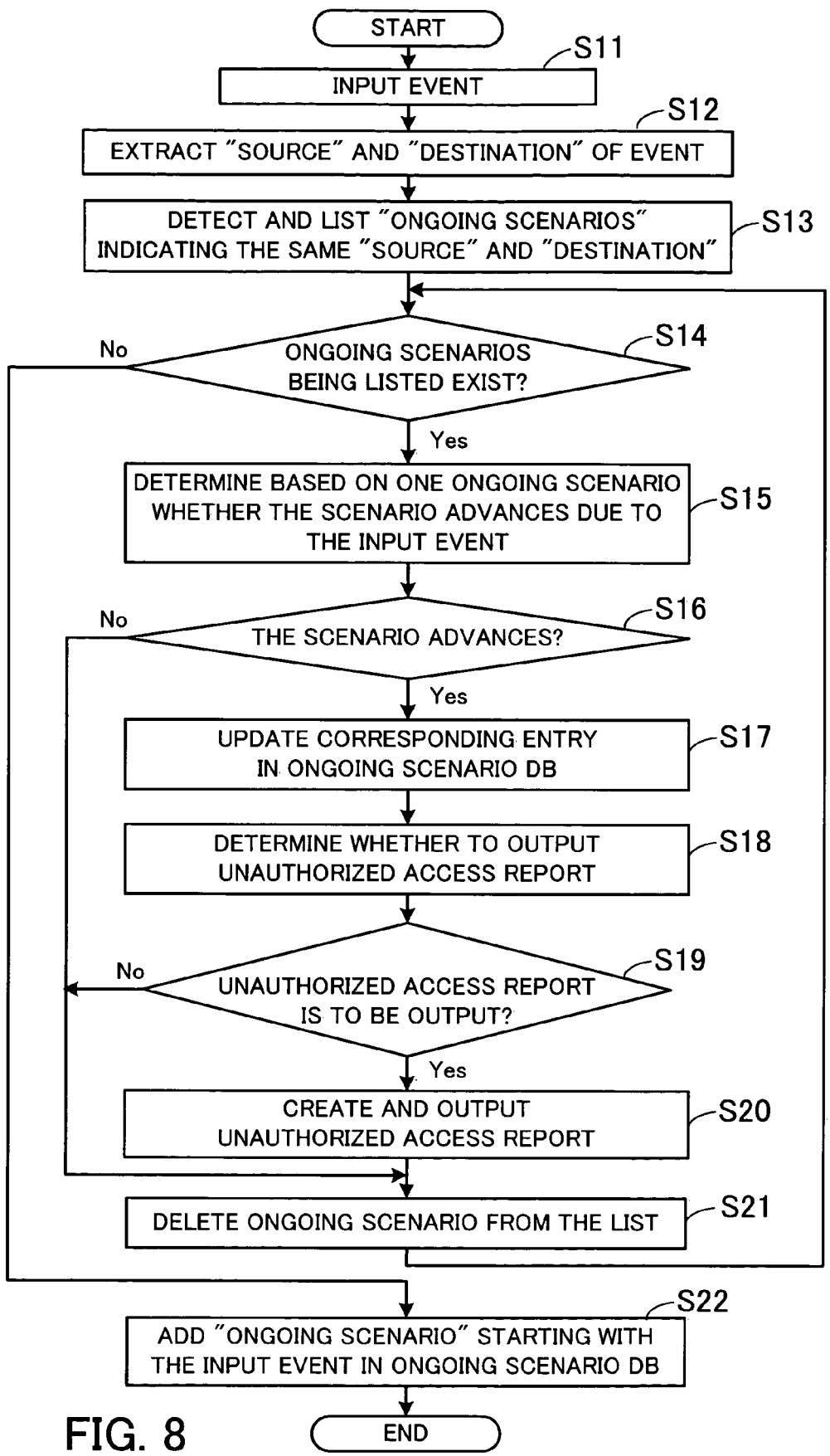
FIG. 8 is a flowchart showing how to detect a scenario.

FIG. 8 is a flowchart showing a procedure of the scenario detection process. This process of FIG. 8 will be described based on step numbers.

[Step S11] The process goes on to step S12 when the involved host extractor 133 receives an event.

[Step S12] The involved host extractor 133 extracts key data from the input event. In this first embodiment, a source IP address and a destination IP address are extracted as the key data. The extracted key data is given to the ongoing scenario detector 134.

[Step S13] The ongoing scenario detector 134 searches the ongoing scenario DB 132 for the entries of ongoing scenarios, with the source IP address and the destination IP address extracted by the involved host extractor 133 as search keys (with an AND operation of the two search keys as searching conditions). The ongoing scenario detector 134 lists the ongoing scenarios detected. These listed ongoing scenarios are given to the event series check unit 135.

For example, assume that an event 51 is input, and the source IP address, the destination IP address and the name of the event 51 are "192.168.1.5," "10.10.100.100" and "e," respectively. In this case, the first entry of the ongoing scenario DB 132 is detected based on the source IP address and the destination IP address of the event 51 in a case where FIG. 7 is used as a figure showing the contents of the ongoing scenario DB 132.

[Step S14] The event series check unit 135 determines whether the ongoing scenario detector 134 has listed some ongoing scenarios. When ongoing scenarios are listed, the process goes on to step S15. When no ongoing scenario is listed, the process goes on to step S22.

[Step S15] The event series check unit 135 picks up one out of the ongoing scenarios being listed to determine whether the input event advances the ongoing scenario.

Specifically, the event series check unit 135 refers to the scenario definition DB 131 to compare a transition from the ongoing scenario detected in step S13 to the input event with the predefined unauthorized access scenario. Then the event series check unit 135 determines whether the transition from the event transitions of the detected ongoing scenario to the event input in step S11 follows the unauthorized access scenario specified by the name of the unauthorized access scenario. When the event transitions (arrangement of event names) match the former part of the unauthorized access scenario, the event transitions are identified as following the unauthorized access scenario. When the event transitions follow the unauthorized access scenario, the event series check unit 135 determines that the scenario continues.

For example, in a case where the event 51 used in explanation of step S13 is input, the scenario is identified as proceeding to the "second stage" of the "unauthorized access scenario B." By referring to the "unauthorized access scenario B" in the scenario definition DB 131, it can be determined that the scenario progresses when an event name "e" is input (that is, "state" changes). Since the name of the event 51 input in step S11 is "e," the event transition based on the unauthorized access scenario happens and the scenario progresses.

When an event corresponding to the first stage of an unauthorized access scenario defined in the scenario definition DB 131 is input, it is determined that an event transition of a new scenario happens.

[Step S16] The event series check unit 135 determines based on the check result whether the event transition happens and the ongoing scenario progresses. When the ongoing scenario progresses, the process goes on to step S17. When the ongoing scenario does not progress, the process goes on to step S21. [Step S17] The ongoing scenario update unit 136 updates the entry of the ongoing scenario of which the event transition occurs. Specifically, the ongoing scenario update unit 136 increases the degree of progress of the corresponding ongoing scenario by one stage.

For example, in a case where the event 51 used in the example of step S13 is input, the "degrees of progress" of the first entry in the ongoing scenario DB 132 is updated from "second stage" to "third stage."

[Step S18] The event series check unit 135 determines whether to output an authorized access report. For example, the event series check unit 135 determines that an unauthorized access report should be output when the ongoing scenario which was advanced in step P17 reaches the final stage of the unauthorized access scenario defined in scenario definition DB 131.

[Step S19] The event series check unit 135 notifies the detected scenario output unit 137 of the occurrence of an unauthorized access when it determines that the output of an unauthorized access report is necessary. Then the process goes on to step S20. When the output of an unauthorized access report is unnecessary, the process goes on to step S21.

[Step S20] The detected scenario output unit 137 creates and outputs an unauthorized access report based on the contents notified from the event series check unit 135.

[Step S21] The event series check unit 135 deletes the ongoing scenario being checked from the list created in step S13. Then the process goes back to step S14 to perform the processes of step S14 to step S20 for another ongoing scenario being listed.

[Step S22] when no ongoing scenario is being listed, the ongoing scenario update unit. 136 adds a new ongoing scenario which starts with the input event, in the ongoing scenario DB 132. That is, when the event input in step S11 matches the first event of an unauthorized access scenario in the scenario definition DB 131, the ongoing scenario update unit 136 adds an entry (a new ongoing scenario) corresponding to this event in the ongoing scenario DB 132.

For example, in a case where the event 51 used in the example of step S13 is input, an entry of which the degree of progress is "first stage" is added in the ongoing scenario DB 132 in association with an unauthorized access scenario starting with "event e" in the scenario definition DB 131. Then this process terminates.

As described above, when a packet including an event based on an unauthorized access scenario is sent from a first computer to a second computer, the unauthorized access can be detected and an administrator can be notified of this access. In this case, the unauthorized access report shows the IP address of a device being used by the attacker, the IP address of a device being a target of the attack, and the name of the unauthorized access scenario completed.

As described above, in the first embodiment, a check process with unauthorized access scenarios is very simple because only the event transitions of ongoing scenarios having the same key data are checked. As a result, even if a large number of packets are traveling on the network 10 via a large-scale network such as the Internet 22, unauthorized accesses can be detected in real time.

Specifically, another kind of unauthorized accesses creates a security hole by increasing server loads. Therefore, stable detection of unauthorized accesses in traffic congestion is very crucial for system security.

Second Embodiment

Next, the second embodiment will be described. The second embodiment shows how to detect unauthorized accesses which are made with changing the sources and destinations of events. Such unauthorized accesses with changing the sources and destinations of events include, for example, a distributed denial of service (DDoS) attack.

DDoS attack is an attack which is launched by sending a large number of packets to a single target from a plurality of attack tools (devices being taken over by an attacker via a network) simultaneously. The DDoS attacks are generated by various kinds of special tools (DDoS attack tools).

Figure 9:
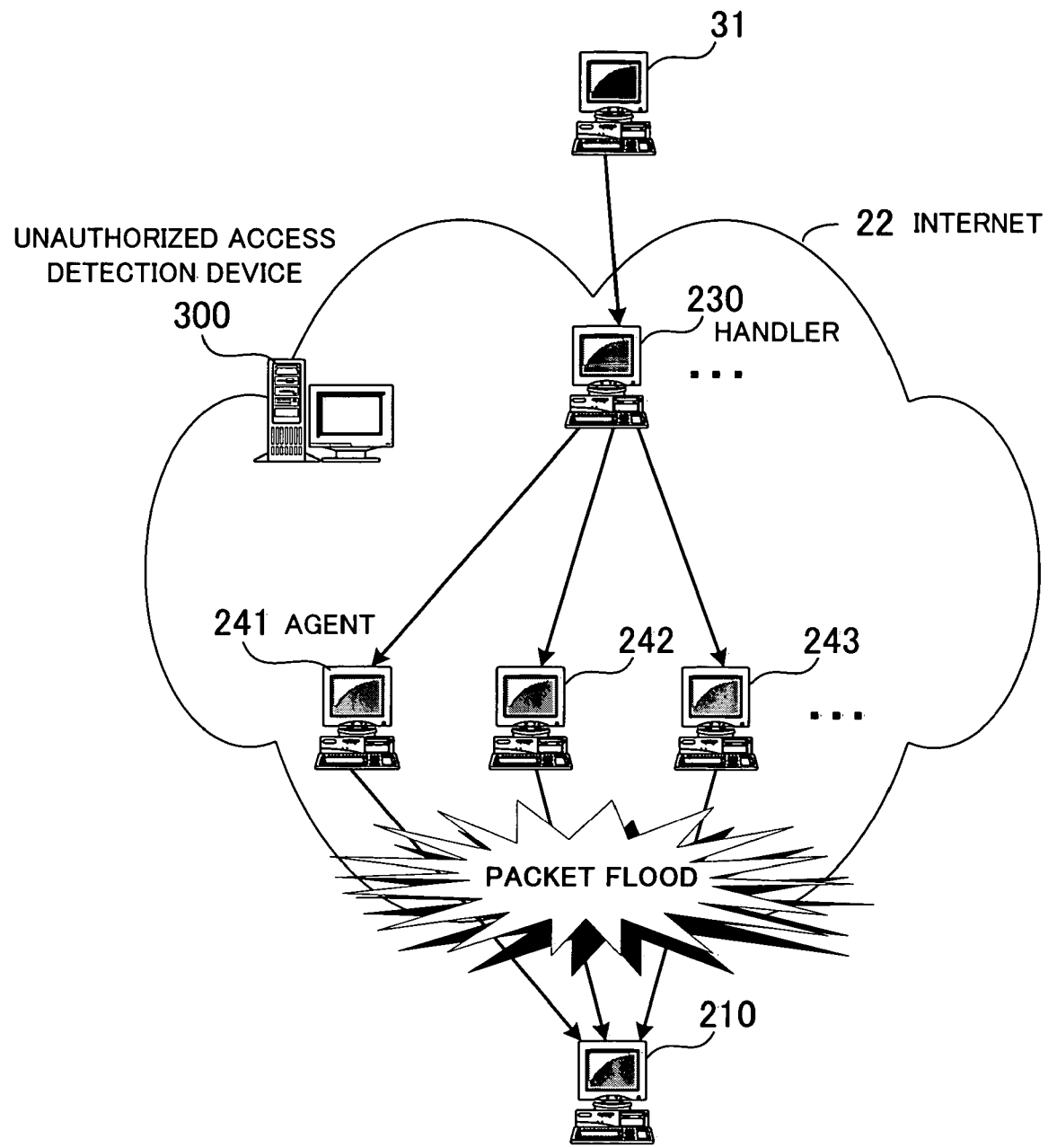
FIG. 9 is a conceptual view showing how to launch a distributed denial of service (DDoS) attack.

FIG. 9 shows the concept showing how to launch a DDoS attack. FIG. 9 shows an example in which an attack is launched on a web server 210 by using a client 31.

An attacker using the client 31 makes computers accessible over the Internet 22 function as agents 241, 242, 243, . . . . Then the attacker sends instructions from the client 31 to each agent 241, 242, 243, . . . via a handler 230.

An "agent" is a processing function to send a large number of packets to a target of a DDoS attack (arbitrary device or network). That is, the "agent" is a host to cause damages to the target directly.

The "handler" corresponds to an interface between the client 31 being used by the attacker and the agents 241, 242, 243, . . . and is a function allowing the attacker to operate the agents. The "handler" is a host to issue instructions from the outside to the agents.

The agents 241, 242, 243, . . . and the handler 230 are generally installed in weak machines which are taken over by the attacker over a network.

The attacker uses the client 31 to give commands to the handler 230. Upon reception of the commands, the handler 230 converts them into commands to operate and set the agents 241, 242, 243, . . . and sends the commands to each agent 241, 242, 243, . . . . Each agent 241, 242, 243, . . . is a processing function executed by a kind of server software. When the agents 241, 242, 243, . . . receive a command from the handler 230, they launch an attack based on the command. For example, they send a large number of packets to the web server 210 which is a target of the attack (packet flood).

Software installation and setting to install these handler 230 and agents 241, 242, 243, . . . into computers on the network are performed over the network. Communication for these purposes can be detected over the network (unless the communication is encrypted).

In this second embodiment, attack scenarios in which an attacker takes over computers for the handler 230 and send commands to the agents 241, 242, 243, . . . are registered in an unauthorized access detection device 300. The unauthorized access detection device 300 monitors event transitions based on unauthorized access scenarios being registered. Then when an event transition based on an unauthorized access scenario reaches a preparation stage of an attack, the unauthorized detection device 300 makes an advance notice of occurrence of the unauthorized access to the administrators of the web server 210, handler 230 and agents 241, 242, 243 . . . .

Since many devices are involved in an unauthorized access for the DDoS: attack, the DDoS attack cannot be detected only by monitoring event transitions of communication between two computers (one is the source and the other is the destination). Therefore, the unauthorized access detection device 300 according to the second embodiment defines: event transitions specifying to the roles of devices in an authorized access scenario.

Further, the unauthorized access detection device 300 sets the role of each device on an unauthorized access scenario at a time of storing an ongoing scenario, the device being involved in a detected event. When devices given roles take the roles and make an event transition based on an unauthorized access scenario, the unauthorized access detection device 300 detects this unauthorized access.

The hardware structure of each of the unauthorized access detection device 300, the handler 230, and the agents 241, 242, 243, . . . shown in FIG. 9 is the same as that shown in FIG. 3.

Hereinafter, the functions of the unauthorized access detection device 300 according to the second embodiment will be described in detail.

Figure 10:
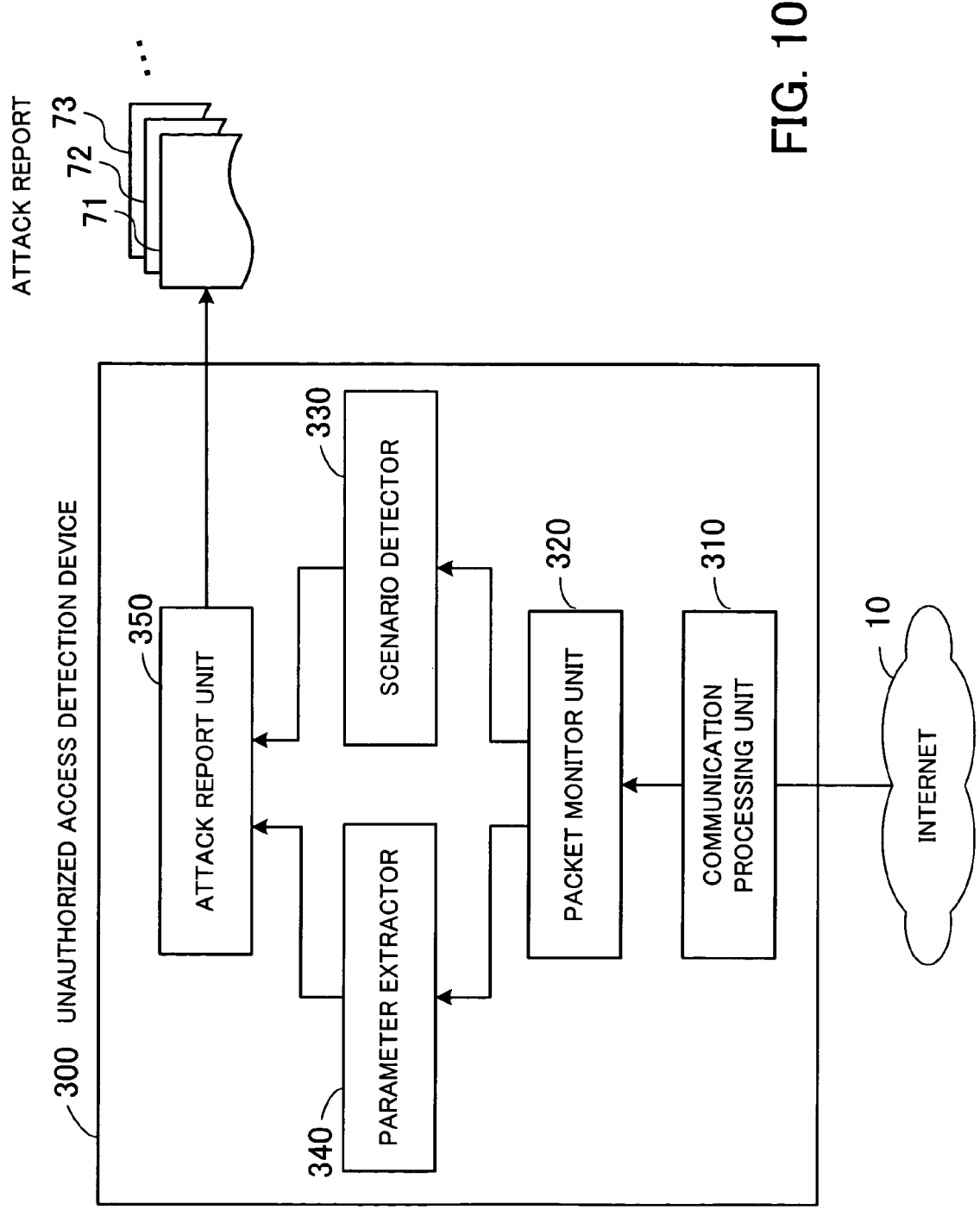
FIG. 10 is a block diagram showing an internal structure of an authorized access detection device according to the second embodiment.

FIG. 10 is a block diagram showing an internal structure of the unauthorized access detection device according to the second embodiment. This unauthorized access detection device 300 is provided with a communication processing unit 310, a packet monitor unit 320, a scenario detector 330, a parameter extractor 340, and an attack report unit 350.

The communication processing unit 310 has the same functions as the communication processing unit 110 of the first embodiment shown in FIG. 4. The packet monitor unit 320 has the same functions as the packet monitor unit 120 of the first embodiment shown in FIG. 4. The packet monitor unit 320, however, gives a detected event to the parameter extractor 340 as well as the scenario detector 330.

The scenario detector 330 detects an event transition to an event detected by the packet monitor unit 320, which is based on an unauthorized access scenario. Then the scenario detector 330 outputs an unauthorized access report based on the event transition based on the unauthorized access scenario. The scenario detector 330 notifies the attack report unit 350 of the unauthorized access report.

The parameter extractor 340 extracts the parameter of a setting command made from the handler 230 to an agent 421, 242, 243, ... for a DDoS attack, from an event received from the packet monitor unit 320. The extracted parameter is given to the attack report unit 350 to reflect an attack report 71, 72, 73.

The attack report unit 350 creates an attack report 71, 72, 73, ... on a future attack based on the event transition detected by the scenario detector 330 and notifies the administrators of the computers (handler 230 and agents 241, 242, 243, ...) being taken over. A notification method of the attack reports 71, 72, 73, ... is, for example, the display of the reports on the screen of terminal devices being used by the administrators. If reporting is not urgent, these attack reports 71, 72, 73, ... can be notified via electronic mails.

With the scenario detector 330 of the unauthorized access detection device 300 having the above structure, occurrence of DDoS attacks can be detected.

Figure 11:
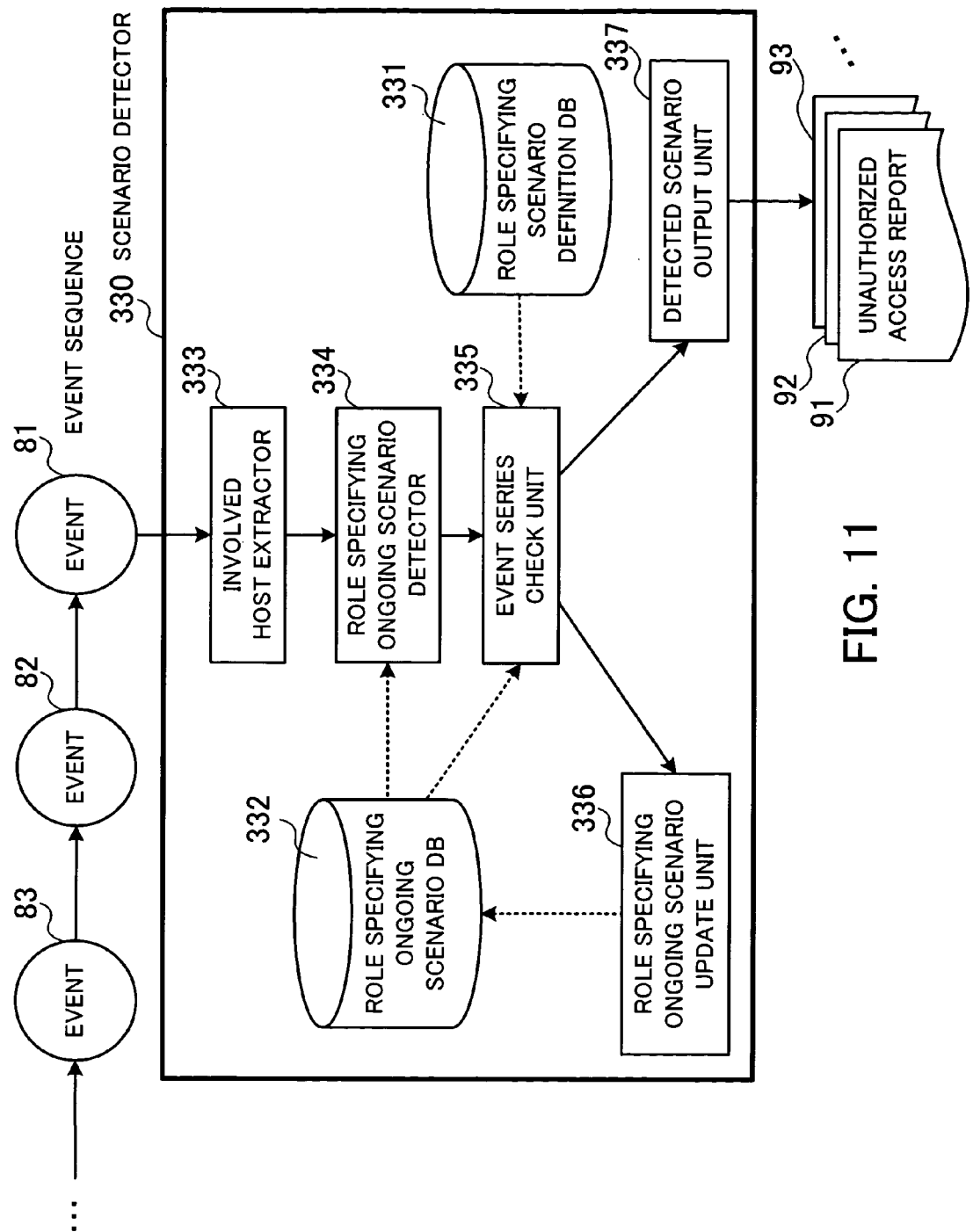
FIG. 11 is a functional block diagram of a scenario detector of the second embodiment.

FIG. 11 is a functional block diagram of the scenario detector of the second embodiment. This scenario detector 330 is equipped with a role specifying scenario definition database (DB) 331, a role specifying ongoing scenario DB 332, an involved host extractor 333, a role specifying ongoing scenario detector 334, an event series check unit 335, a role specifying ongoing scenario update unit 336, and a detected scenario output unit 337.

The involved host extractor 333, the event series check unit 335, and the detected scenario output unit 337 have the same functions as the corresponding units of the scenario detector 130 of the first embodiment shown in FIG. 5. The scenario detector 330 sequentially obtains events 81, 82, 83, ..., and outputs an unauthorized report 91, 92, 93, ... when detecting an unauthorized access.

The role specifying scenario definition DB 331 is a database storing predefined unauthorized access scenarios. Each unauthorized access scenario of the role specifying scenario definition DB 331 specifies the roles of involved devices. For example, a role as a client of an attacker, a role as a handler, and a role as an agent are specified.

The role specifying ongoing scenario DB 332 is a database in which the transitions of events occurred between devices assigned roles are registered for every ongoing scenario.

The role specifying ongoing scenario detector 334 searches, with a "source IP address" and "destination IP address" extracted by the involved host extractor 333 as keys, the role specifying ongoing scenario DB 332 for a role specifying ongoing scenario in which a device having one of these IP addresses is involved. The detected role specifying ongoing scenario is given to the event series check unit 335.

When the role specifying ongoing scenario detector 334 detects a relevant entry from the role specifying ongoing scenario DB 332, the event series check unit 335 obtains "the name of an unauthorized access scenario" and the "degree of progress" from the entry. Then the event series check unit 335 refers to the role specifying scenario definition DB 331 to determine based on the name of the input event whether a transition to the input event follows the unauthorized access scenario. If the event follows the unauthorized access scenario, the role specifying ongoing scenario update unit 336 is notified of this matter.

Specifically, since each device is assigned a role in this, second embodiment, the event series check unit 335 specifies the roles of the devices with the "source IP address" and "destination IP address." Then when the devices of which the roles are specified take the roles in the input event based on an unauthorized access scenario being defined in the role specifying scenario definition DB 331, the event series check unit 335 determines that the scenario continues.

When the event series check unit 335 determines that the scenario continues, the role specifying ongoing scenario update unit 336 updates the corresponding entry in the role specifying ongoing scenario DB 332. Specifically, the role specifying ongoing scenario update unit 336 sets the roles of the devices having the "source IP address" and "destination IP address" extracted from the input event and increases the degree of progress of the scenario by one stage.

Figure 12:
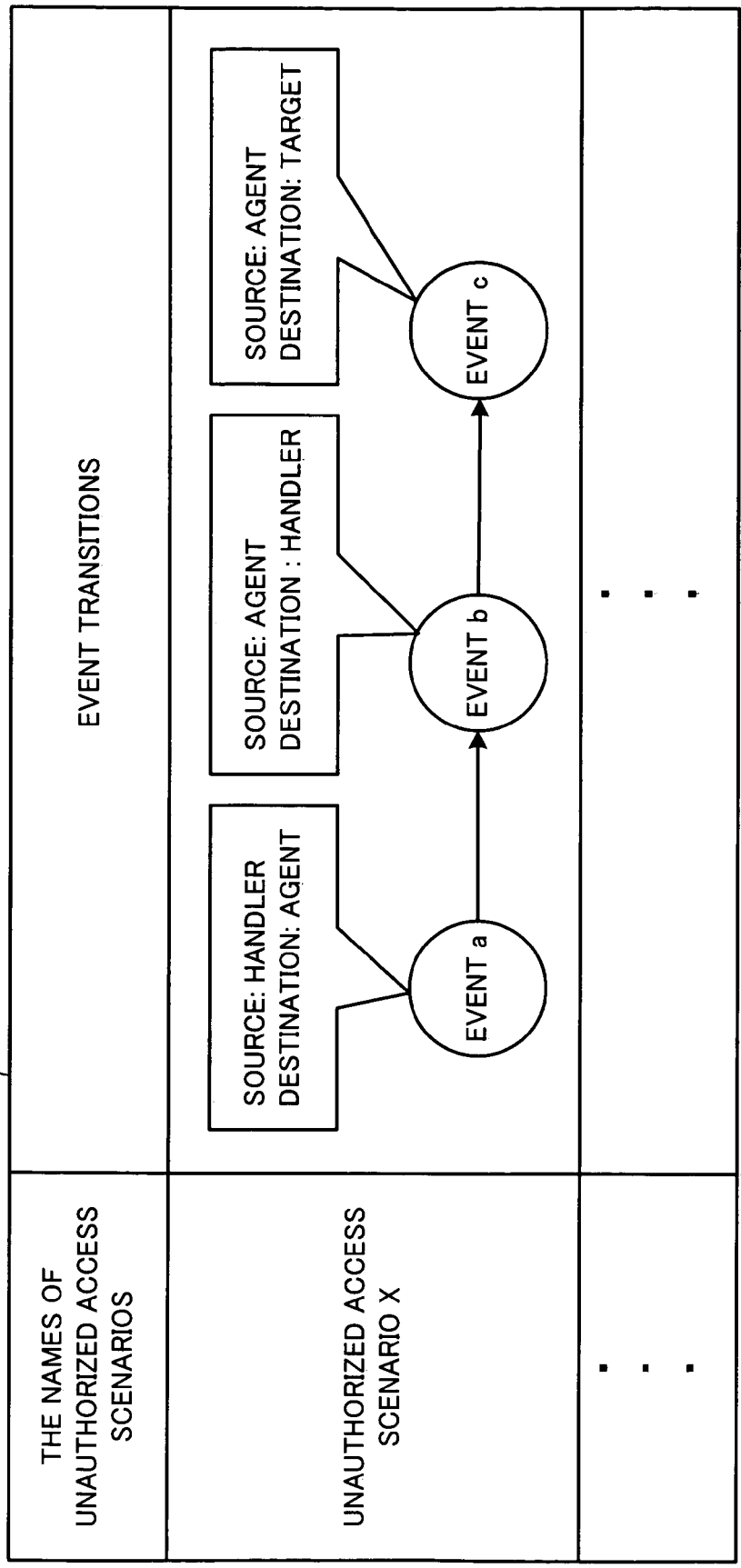
FIG. 12 shows an example of a data structure of a role specifying scenario definition DB.

FIG. 12 shows an example of a data structure of the role specifying scenario definition DB. The role specifying scenario definition DB 331 has items of the names of unauthorized access scenarios and event transitions. The names of unauthorized access scenarios indicate the names set for DDoS attack scenarios. The event transitions indicate DDoS attack scenarios represented by event transitions. Each event registered in the item of the event transitions indicates the roles of the source and the destination in addition to the event name. In this way, "the roles on a relevant scenario" are related to the "source" device and the "destination" device in each event.

In this example of FIG. 12, an event a, an event b, and an event c are registered as the event transitions of an unauthorized access scenario X. In the event a, the roles of the source and the destination are a handler and an agent, respectively. In the event b, the roles of the source and the destination are an agent and the handler, respectively. In the event c, the roles of the source and the destination are an agent and a target. The "target" is a target of an unauthorized access.

In this way, roles are set to a source and a destination in each event. When a device (identified by an IP address) is assigned a role, this device takes this role in following events. For example, in the event a of the unauthorized access scenario X, the source device is the handler and the destination device is the agent. Therefore, when the event b is input next, the scenario is determined to progress in a case where the device which was the handler in the event a is the destination and the device which was the agent in the event a is the source.

Further, in the event c, the target appears as a new role. Therefore, the scenario is determined to progress, irrespective of a destination, provided that the device which was an agent in the event b is a source.

FIG. 13 shows an example of a data structure of the role specifying ongoing scenario DB. The role specifying ongoing scenario DB 332 has items of role-specified IP addresses, the names of unauthorized access scenarios and the degrees of progress.

The item of the role-specified IP addresses indicates the role of each device in the last event of a role specifying ongoing scenario. A device is identified by an IP address. Note that the roles of all devices involved in all past events can be set in the item of the role-specified IP addresses.

The item of the names of unauthorized access scenarios indicates the names of unauthorized access scenarios being followed.

The item of the degrees of progress indicates the degrees of progress of ongoing scenarios. The degree of progress is represented by which stage of an unauthorized access sequence the last event of each ongoing scenario is in.

The scenario detector 330 having the above structure detects an unauthorized access in a case where at least three devices take their roles based on an unauthorized access scenario specifying the roles. Specifically, when an event 81, 82, 83, . . . is input, the involved host extractor 333 extracts key data from the input event 81, 82, 83, . . . . The key data are a source IP address and a destination IP address.

Then the role specifying ongoing scenario detector 334 detects an entry indicating at least one role-specified IP address of the key data, from the role specifying ongoing scenario DB 332. The detected entry is notified to the event series check unit 335.

The event series check unit 335 refers to the role specifying scenario definition DB 331 to compare an unauthorized access scenario corresponding to the entry detected by the role specifying ongoing scenario detector 334 with the input event. When the input event follows the unauthorized access scenario being compared, the scenario is determined to continue.

When it is determined that the scenario continues, the role specifying ongoing scenario update unit 336 updates the degree of progress of the entry in the role specifying ongoing scenario DB 332. When the input event corresponds to the first event of an unauthorized access scenario in the role specifying scenario definition DB 331, the role specifying ongoing scenario update unit 336 adds a new entry in the role specifying ongoing scenario DB 332.

In addition, when the event series check unit 335 decides to advance the scenario and the scenario reaches the final stage, it notifies the detected scenario output unit of this matter. Then the detected scenario output unit 337 outputs an unauthorized access report on the completed scenario.

As described above, in this second embodiment, it is determined whether an input event and a progressing ongoing scenario specifying the source device or destination device of the input event match an unauthorized access scenario, by also considering the role of each host. That is, the source and destination devices of each event are associated with "roles" on an unauthorized access scenario. As a result, not only "unauthorized access scenarios for one-way communication between two devices" but also "scenarios for bidirectional communication" and "unauthorized access scenarios involving at least three devices," like DDoS attacks, can be detected.

Third Embodiment

Next, the third embodiment will be described. The third embodiment extends "event transitions" indicating an unauthorized access scenario to "state transitions" in a scenario definition DB.

Note that the constructional elements of the functions of an unauthorized access detection device in the third embodiment are almost the same as those in the first embodiment shown in FIG. 4 and FIG. 5. Hereinafter, different features from the first embodiment will be described with reference to the structures shown in FIG. 4 and FIG. 5.

In a scenario detector 130 of the third embodiment, not only simple event transitions but also state transitions with events as turning points are stored in a scenario definition DB 131. An event series check unit 135 determines whether there is a transition from the current state to an input event. Therefore, it can be expected that more complicated scenario is represented simply and an attack model database is reduced.

Figure 14:
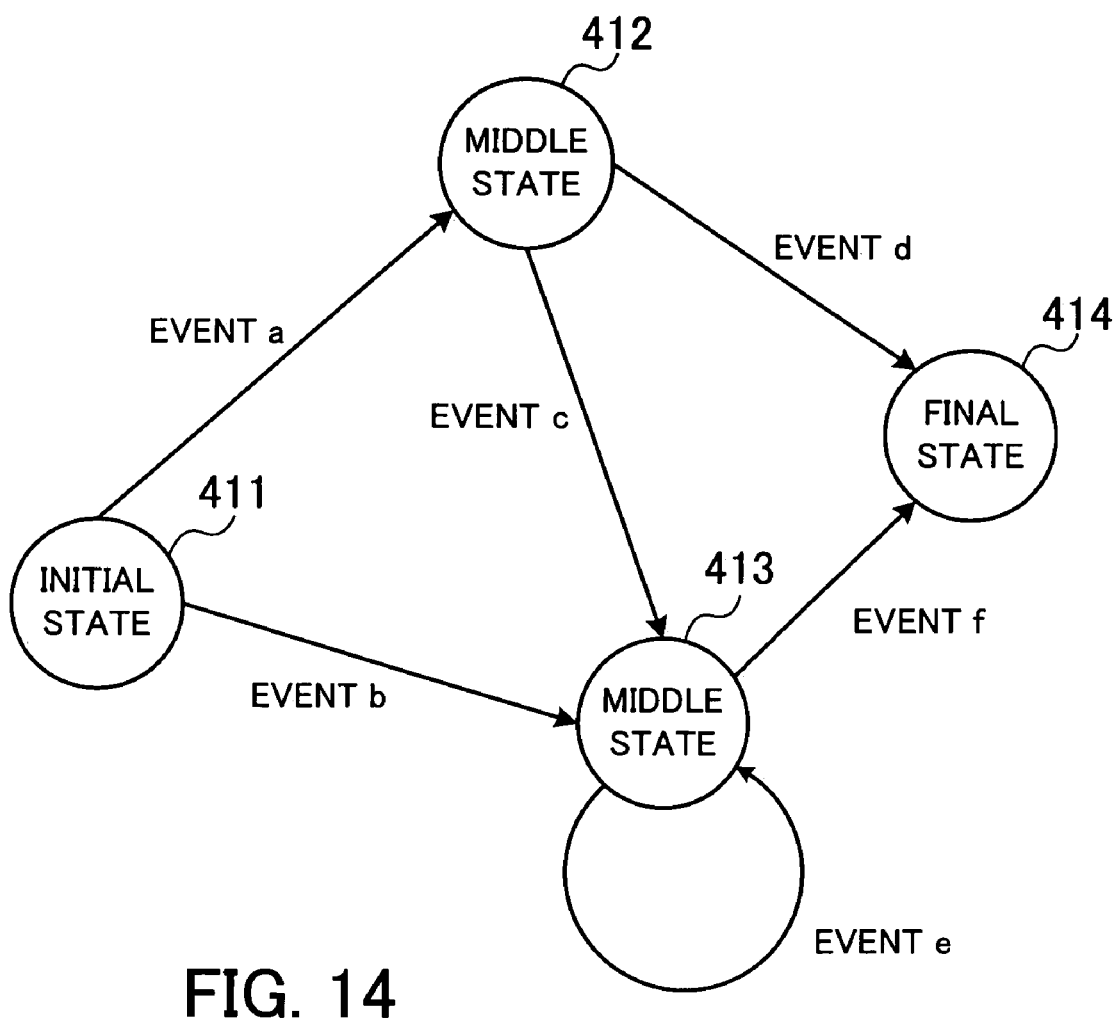
FIG. 14 shows event transitions defined in a scenario definition DB of the third embodiment.

FIG. 14 shows event transitions defined in the scenario definition DB according to the third embodiment. In this example, event transitions are defined in the form of scenario state transitions. As scenario states, there are an initial state 411, middle states 412 and 413, and a final state 414.

A transition is made from the initial state 411 to the middle state 412 by an event a. A transition is made from the initial state 411 to the middle state 413 by an event b. A transition is made from the middle state 412 to the middle state 413 by an event c. A transition is made from the middle 412 to the final state 414 by an event d. A transition is made from the middle state 413 to the final state 414 by an event f. The middle state 413 is kept when an event e occurs in the middle state 413.

In this way, in the third embodiment, events are considered as transition conditions for state transitions. Therefore, the events can be compared with scenarios.

Note that state transitions should include an "initial state" corresponding to the first stage of event transitions and a "final state" corresponding to the final stage.

In addition, in the ongoing scenario DB 132 of the unauthorized access detection device of the third embodiment, the "state names" (middle state 412 etc. in the example of FIG. 14) are used as the "degree of progress" for every entry.

Fourth Embodiment

Next the fourth embodiment will be described. In this fourth embodiment, a valid period is set to each of event transitions or state transitions using events as turning points, which are stored in a scenario definition database. Then an event being processed and an ongoing scenario associated with the key data of the event are checked to see if they make an event transition or a state transition, by also considering the valid period of the transition. That is, even if an input event matches the key data of an ongoing scenario, the event does not advance the ongoing scenario in a case where the valid period of the ongoing scenario has expired. Therefore, events which happened at a time interval longer than a corresponding valid period can be treated as events in different scenarios.

Note that the constructional elements of the functions of an unauthorized access detection device of the fourth embodiment are almost the same as those of the first embodiment shown in FIG. 4 and FIG. 5. Hereinafter, different features from the first embodiment will be described with reference to FIG. 4 and FIG. 5.

Figure 15:
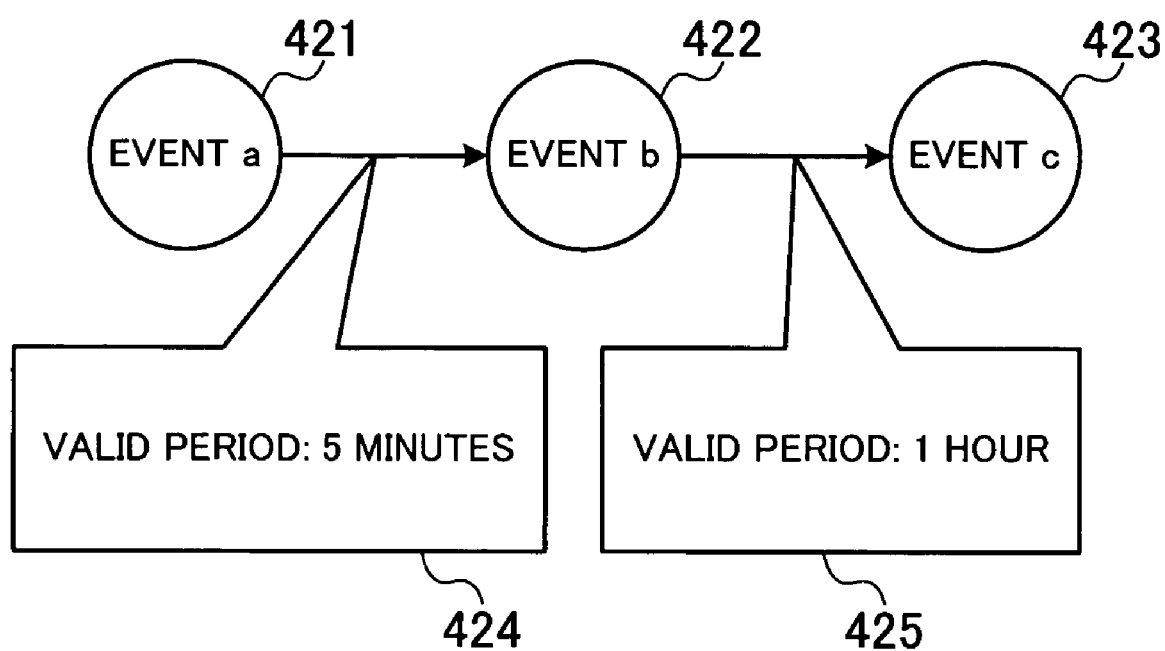
FIG. 15 shows event transitions defined in a scenario definition DB of the fourth embodiment.

FIG. 15 shows event transitions defined in a scenario definition DB of the fourth embodiment. As shown in. FIG. 15, event transitions are defined by arranging events 421 to 423. In addition, valid periods 424 and 425 are set to advance this scenario.

Specifically, the valid period 424 for a transition from the event 421 to the event 422 is five minutes. The valid period 425 for a transition from the event 422 to event 423 is one hour.

In this way, a "valid period" is set to a transition between events in an unauthorized access scenario indicating attack models, and the "time of previous transition" is stored in each entry in the ongoing scenario DB 132. An event series check unit 135 determines whether a transition happens, based on the "valid period" in an unauthorized access scenario, the "time of previous transition" in the ongoing scenario and the current time.

For example, assume that the "time of previous transition" is at 12:00 and a valid period to a next transition is five minutes. When a next event is input at or before 12:05, a transition to this event is valid, while the transition to this event is invalid when the next event is input after 12:05.

By setting a valid period to advance a scenario in this way, detection of invalid unauthorized accesses can be prevented.

In addition, the ongoing scenario update unit 136 is able to delete unnecessary entries of which the valid periods have expired, from the ongoing scenario DB 132. In this case, the ongoing scenario update unit 136 deletes entries of which the valid periods have expired, from the ongoing scenario DB 132 at certain timing (for example, at prescribed time intervals) by checking the "time of previous transition" in the ongoing scenario DB 132 and the current time.

For example, the ongoing scenario update unit 136 searches all scenarios in the ongoing scenario DB 132 for scenarios of which the valid periods have expired, every ten minutes. Then the ongoing scenario update unit 136 deletes the entries of the detected ongoing scenarios from the ongoing scenario DB 132. By doing so, scenarios of which the valid periods have expired can be deleted within ten minutes.

By deleting ongoing scenarios of which the valid periods have expired in this way, the ongoing scenario DB 132 can be avoided from storing a large number of ongoing scenarios which do not continue.

Fifth Embodiment

The fifth embodiment will be described next. In the fifth embodiment, an unauthorized access report is output to notify a sign of a future unauthorized access when an ongoing access scenario reaches a middle stage of an unauthorized access scenario. The sign of the unauthorized access is predicted by using weights which are added every time when an ongoing scenario progresses. That is, when the total weight of the ongoing scenario exceeds a prescribed value, it is predicted that an unauthorized access will be made.

In the first to fourth embodiments, an unauthorized access report is output when an ongoing scenario reaches the final stage of an unauthorized access scenario. When the ongoing scenario reaches a middle stage of the unauthorized access scenario, on the other hand, it can be determined that there is a very strong possibility that an attack will finally happen. Therefore, in this fifth embodiment, a report is output even in the middle of a scenario when it is determined that there is a very strong possibility that an attack will be launched.

Note that the constructional elements of the functions of an unauthorized access detection device of the fifth embodiment are almost the same as those of the first embodiment shown in FIG. 4 and FIG. 5. Hereinafter, different features from the first embodiment will be described with reference to the structures shown in FIG. 4 and FIG. 5.

In the fifth embodiment, a weight is previously given to each event and transition of event transitions and state transitions.

Figure 16:
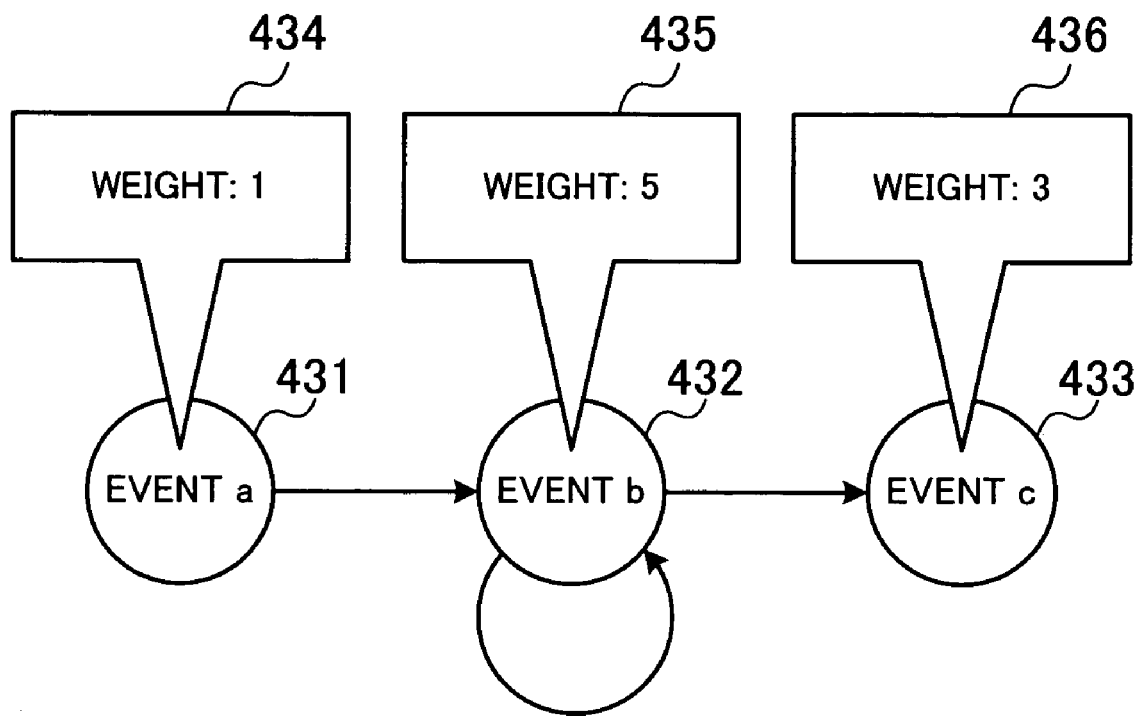
FIG. 16 shows an example of event transitions set in an event transition DB of the fifth embodiment.

FIG. 16 shows event transitions set in an event transition DB of the fifth embodiment. As shown in FIG. 16, each event 431 to 433 composing event transitions has a weight 434 to 436. For example, the weights of the events 431, 432 and 433 are one, five and three, respectively.

In addition, the event 432 may be repeated. For example, a port scan event may happen repeatedly.

Furthermore, a report output threshold value is set to the event transitions of an unauthorized access scenario. The report output threshold value is an index for determining whether an attack will occur. When the total weight of generated events exceeds a report output threshold value, it is determined that an attack may happen, and a report is output.

By setting a weight to an event, the ongoing scenario DB 132 has an item of total weights, instead of the item of the degrees of progress.

FIG. 17 shows an example of a data structure of an ongoing scenario DB of the fifth embodiment. The ongoing scenario DB 132a of the fifth embodiment has items of pairs of source IP address and destination IP address, the names of unauthorized access scenarios, and total weights. The total weight shows the total of weight set to events which occurred in a corresponding ongoing scenario.

The event series check unit 135 adds the weight of an input event to the total weight of the corresponding ongoing scenario when the ongoing scenario is advanced by inputting the event. When the total weight after addition exceeds the report output threshold value of an unauthorized access scenario, the event series check unit 135 determines that an unauthorized access will happen with a high possibility, and notifies the detected scenario output unit 137 of this matter. The detected scenario output unit 137 outputs an unauthorized access report, considering that the unauthorized access was detected.

For example, consider a case of event transitions shown in FIG. 16. When a transition is changed from the event 431 to the event 432, a report is not output because the total weight is "six." When the event 432 happens again, the total weight is "nine" and exceeds the report output threshold vale of "eight." Therefore, an unauthorized access report is output.

As another example, in a case where a transition is made from the event 431 to the event 432 and then the event 432 is input again, the total weight is "11." In this case, an unauthorized access report is output as well because the total weight exceeds the report output threshold value of "8."

Note that the ongoing scenario update unit 136 updates the value of the total weight of the corresponding entry in the ongoing scenario DB 132 when the ongoing scenario progresses. That is, the weight of an event newly occurred is added to the current total weight.

Since the possibility of an unauthorized access can be determined by weight, an unauthorized access report can be output to issue a warning to the administrator of the system before an attack is launched.

Note that an unauthorized access report notifying a sign of a future attack can be output by using the degree of progress, not by using the weight. For example, a threshold value indicating which numbered event of an unauthorized access scenario a report should be output in is set for each unauthorized access scenario. When the degree of progress of an ongoing scenario exceeds the threshold value, the scenario series check unit 135 notifies the detected scenario output unit 137 of this matter. Then the detected scenario output unit 137 outputs an unauthorized access report.

Sixth Embodiment

In the sixth embodiment, the type and scale of possible damages are predicted in view of the state of an unauthorized access scenario, the events included in the scenario, and the parameters attached to the events. In addition, preventative measures can be taken automatically depending on the predictions.

In other words, possible future events can be predicated based on the following event transitions of an unauthorized access scenario while an ongoing scenario is progressing based on the unauthorized access scenario defined by event series. However, even if possible future events are found, effective measures against the unauthorized accesses cannot be always taken. Effective measures against unauthorized accesses can be more likely to be taken if the type, scale, and period of possible future damages can be determined.

Figure 18:
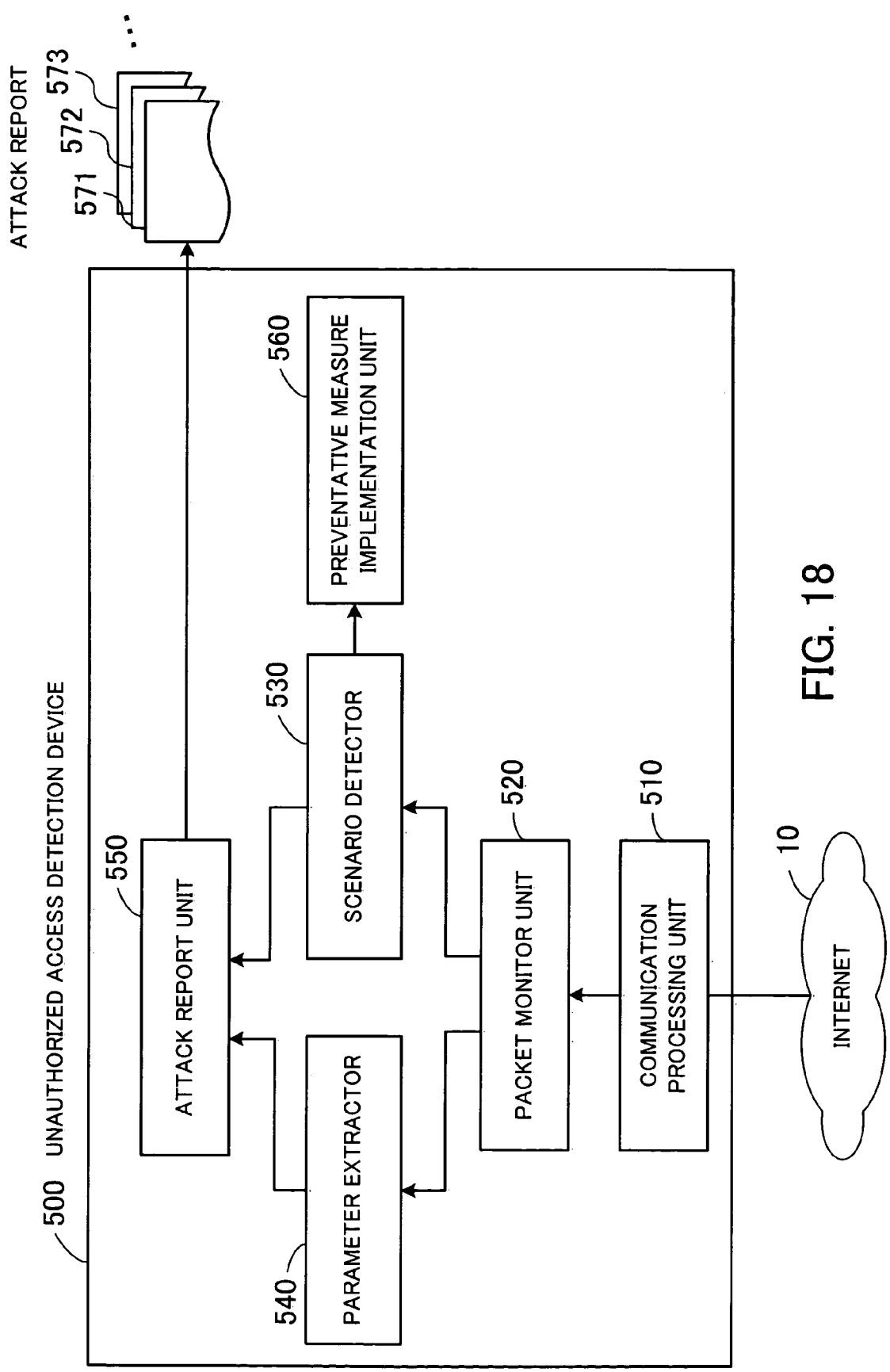
FIG. 18 is a block diagram showing an internal structure of an unauthorized access detection device according to the sixth embodiment.

FIG. 18 is a block diagram showing an internal structure of an unauthorized access detection device according to the sixth embodiment. This unauthorized access detection device 500 is provided with a communication processing unit 510, a packet monitor unit 520, a scenario detector 530, a parameter extractor 540, an attack report unit 550 and a preventative measure implementation unit 560.

The communication processing unit 510, the packet monitor unit 520, the parameter extractor 540, and the attack report unit 550 have the same functions as the corresponding constructional elements of the second embodiment shown in FIG. 10. The scenario detector 530 detects an event transition to an event detected by the packet monitor unit 520, which is based on an unauthorized access scenario. Then the possibility of an attack and the scale of damages are predicted with reference to the event transitions based on the unauthorized access scenario, depending on the progress of preparation of the unauthorized access. The scenario detector 530 notifies the attack report unit 550 of the prediction result. The scenario detector 530 also makes a measure request to the preventative measures implementation unit 560 when it determines based on the predictions that preventative measures are necessary.

The preventative measures implementation unit 560 takes preventative measures to prevent an attack in response to the measure request from the scenario detector. For example, this unit 560 interrupts communication for a prescribed period of time when an unauthorized access is predicted.

Such the unauthorized detection device 500 is able to predict unauthorized accesses and take preventative measures as well as outputting attack reports 571, 572, 573, . . . .

Figure 19:
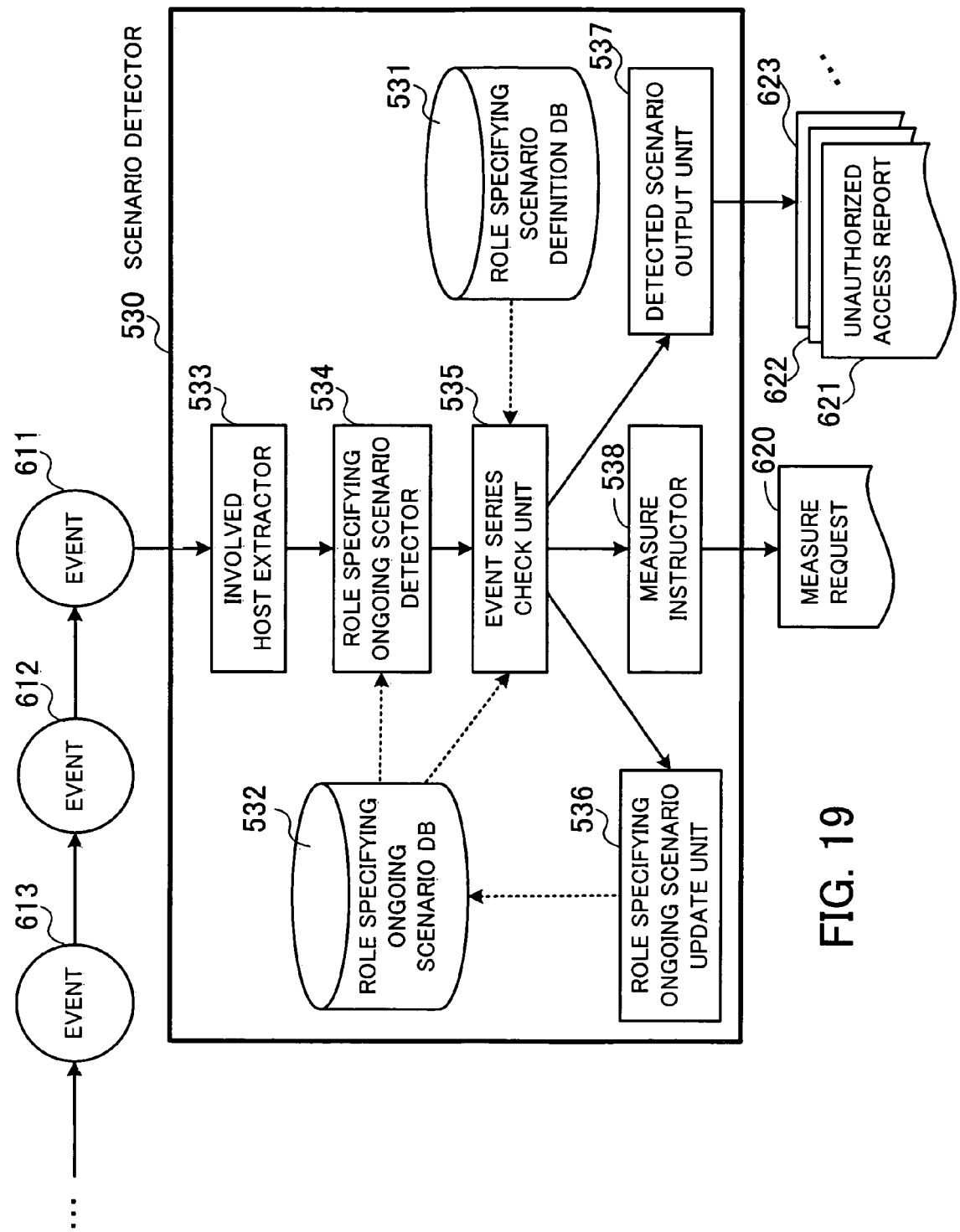
FIG. 19 is a functional block diagram of a scenario detector of the sixth embodiment.

FIG. 19 is a functional block diagram of a scenario detector of the sixth embodiment. The scenario detector 530 is provided with a role specifying scenario definition database (DB) 531, a role specifying ongoing scenario DB 532, an involved host extractor 533, a role specifying ongoing scenario detector 534, an event series check unit 535, a role specifying ongoing scenario update unit 536, a detected scenario output unit 537 and a measure instructor 538.

The role specifying scenario definition DB 531, the role specifying ongoing scenario DB 532, the involved host extractor 533, the role specifying ongoing scenario detector 534, the event series check unit 535, the role specifying ongoing scenario update unit 536, and the detected scenario output unit 537 have almost the same functions as the corresponding constructional elements of the second embodiment shown in FIG. 11. Hereinafter, different functions from the second embodiment out of these constructional elements and the functions of the measure instructor 538 will be described.

The event series check unit 535 compares an unauthorized access scenario specifying roles with a state transition from an ongoing scenario to an input event. At this time, the event series check unit 535 refers to a predicted impact/measure definition table which is set for each state, to predict a period of time until an impact (attack start), the possibility of the impact which will happen within the period of time, and the scale of the impact. Then the event series check unit 535 determines measures depending on the predicted attack. If the measures should be taken as soon as possible, the contents of the measures are notified to the measure instructor 538. If the measures are not urgent, the contents of the measures are notified to the detected scenario output unit 537.

The detected scenario output unit 537 outputs an unauthorized access report on a predicted attack when receiving the contents of the attack. The output unauthorized access report is notified from the attack report unit 550 to the administrators of the unauthorized access detection device 500, the target device, and the devices serving as tools of the attack.

Upon reception of the contents of the measures from the event series check unit 535, the measure instructor 538 creates and gives a measure request 620 based on the contents to the preventative measure implementation unit 560. Then the preventative measure implementation unit 560 takes prescribed measures such as interruption of communication.

Further, in the role specifying scenario definition DB 531 of the sixth embodiment, unauthorized access scenarios are defined in the form of sate transitions similar to those shown in FIG. 14. For example, unauthorized access scenarios based on Trinoo which is a DDoS attack program can be registered in the role specifying scenario definition DB 531.

FIG. 20 shows setting commands for Trinoo. Commands to handler shown in FIG. 20 are commands that an attacker input into a handler. Commands to agent are commands the handler sends to agents in response to input commands. By sequentially inputting commands shown in FIG. 20 to the handler, the attacker can instruct a packet flood attack.

For example, when an attacker inputs "msize," the handler sends "rsz" to agents. This command instructs the agents to set a UDP packet size (Byte) with a parameter for future packet flood.

When the attacker inputs "mtimer," the handler sends "bbb" to the agents. This command instructs the agents to set a period (seconds) of the future flood with a parameter.

When the attacker inputs "mping," the handler sends "png" to the agents. This command is a command to confirm whether the agents are active or not. Only active agents return replies to "png."

When the attacker inputs "die," the handler sends "d1e" to the agents. This command instructs all the agents to stop their operation.

When the attacker inputs "dos," the handler sends "aaa" to the agents. This command instructs the agents to cause a UDP flood to the IP address specified by a parameter.

When the attacker inputs "mdos," the handler sends "xyz" to the agents. This command instructs the agents to cause a UDP flood to the IP address specified by a parameter. In this case, a plurality of IP address can be specified as targets of the UDP flood.

The agents attack a web server etc. in response to these instructions from the handler.

Therefore, event transitions based on the commands shown in FIG. 20 are registered as unauthorized access scenarios in the role specifying scenario definition DB 531.

Figure 21:
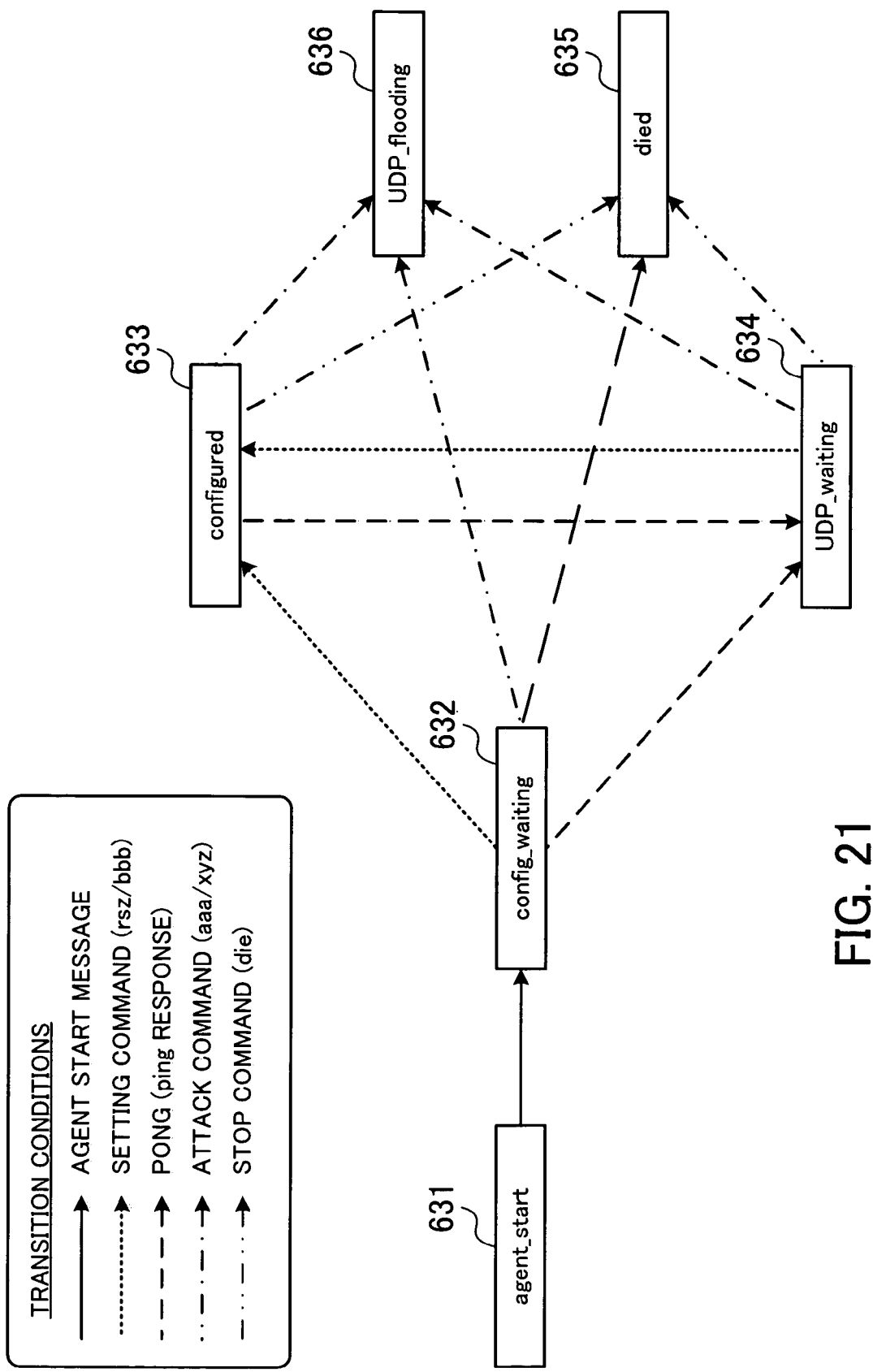
FIG. 21 shows event transitions of unauthorized access scenarios based on "Trinoo"

FIG. 21 shows event transitions of unauthorized access scenarios according to Trinoo. In this example, the initial state 631, middle states 632 to 634, and the final states 635 and 636 are indicated in the event transitions.

In FIG. 21, an agent start message event is indicated by a solid-line arrow. Setting command events are indicated by doted-line arrows. PONG (response to ping) events are indicated by broken-line arrows. Attack command events are indicated by chain-dashed-line arrows. Stop command events are indicated by chain-double-dashed-line arrows.

When an agent start message is issued in the initial state 631 (an instruction waiting state of "agent_start"), the state is transited to the middle state 632.

The middle state 632 is a state of "config_waiting (attack preparing state)." Since the middle state 632 means that an attack is being prepared, there is a low possibility that a flood is generated. When a setting command is issued in the middle state 632, the state is transited to the middle state 633. When PONG is issued in the middle state 632, on the other hand, the state is transited to the middle state 634. When an attack command is issued in the middle state 632, the state is transited to the final state 636.

The middle state 633 is a state of "configured (attack ready)." This state 633 means that the packet flood attack is slightly more likely to happen. When an attack command is issued in this middle state 633, the state is transited to the final state 636. In addition, when a stop command is issued in the middle state 633, the state is transited to the final state 635. When PONG is issued in the middle state 633, the state is transited to the middle state 634.

The middle state 634 is a state of "UDP_waiting (waiting for instruction of UDP flood start)." This state 634 means that the packet flood attack is more likely to happen. When an attack command is issued in this middle state 634, the state is transited to the final state 636. When a stop command is issued in this middle state 634, the state is transited to the final state 635. When a setting command is issued in the middle state 634, the state is transited to the middle state 633.

The final state 635 is a state of "died (agent stop)." This final state 635 means that there is no possibility of a packet flood attack in this ongoing scenario.

The final state 636 is a state of "_UDP flooding (occurrence of flood)." The packet food attack has started in this final state 636.

By using the command-based Trinoo and monitoring parameters included in commands, information on final damages (time of a DDoS attack, packet size, etc.) can be predicted. Note that a DDoS attack is said to be hard to prevent its damages once the attack starts. Therefore, by predicting DDoS attacks, stepwise and flexible measures are necessarily selected and taken before the DDoS attacks happen.

In this sixth embodiment, a predicted impact/measure definition table is previously set for each state.

Figure 22:
FIG. 22 shows an example of a predicted impact/measure definition table for a "UDP_waiting" state.

FIG. 22 shows an example of a predicted impact/measure definition table corresponding to the "UDP_waiting" state. The predicated impact/measure definition table 640 indicates, for a predicted impact, periods of time until the impact (attack), the possibilities of the impact, and the scale of the impact. Note that the scale of impacts are indicated by three steps, i.e., "large," "medium" and "small." In addition, measures against a predicated impact are set.

In the example of FIG. 22, the possibility of an impact within five minutes is 70% and the scale of the impact is "large." The possibility of an impact within one hour is 10%, and the scale of the impact is "large." The possibility of an impact within one day is 10% and the scale of the impact is "medium."

For such predicated impacts, measures to interrupt communication for one hour are taken because of the serious large impact. In a case where the measures are automatically taken, a measure request instructing to interrupt communication is sent to the preventative measure implementation unit 560. The preventative measure implementation unit 560 interrupts communication between, for example, the handler and agents.

FIG. 23 shows an example of a predicated impact/measure definition table corresponding to the "config_waiting" state. According to this predicated impact/measure definition table 650, the possibility of an impact within one hour is 10% and the scale of the impact is "medium." The possibility of an impact within one day is 40% and the scale of the impact is "large." The possibility of an impact within three days is 30% and the scale of the impact is "large."

Against such predicted impacts, measures do not have to be taken soon (without urgency), as compared with the case of FIG. 22. Therefore, as measures, a contact is made to the administrator of a host which probably launches an attack (administrative host). In addition, the communication is monitored for three days thereafter, and interrupted if necessary. In a case where these measures are taken automatically, a measure request 620 instructing to interrupt communication is sent to the preventative measure implementation unit 560. The preventative measure implementation unit 560 starts to monitor the communication accordingly, for example.

If the type and locations of agents preparing a DDoS attack (the IP addresses of the devices) can be specified, a wasteful bandwidth of the DDoS attack can be predicated by detecting and analyzing the specifications of the devices and surrounding networks.

It should be noted that, although the above-described embodiments have described an unauthorized access detection device as a single device, the functions of the unauthorized access detection device can be installed in a firewall or another computer.

The above-described processing functions are actually implemented on a computer with a program describing processing contents of the intended functions of an unauthorized access detection device. This program is stored in a computer-readable storage medium. Suitable computer-readable storage media include magnetic storage media, optical discs, magneto-optical storage media, and semiconductor memory devices. Magnetic storage media include hard disk drives (HDD), flexible disks (FD), and magnetic tapes. Optical discs include digital versatile discs (DVD), DVD-random access memory (DVD-RAM), compact disc read-only memory (CD-ROM), CD-recordable (CD-R), CD-rewritable (CD-RW). Magneto-optical storage media include magneto-optical discs (MO).

To distribute program products, portable storage media, such as DVD and CD-ROM, are used. Network-based distribution of software program has also become popular, in which master program files stored in a server computer are downloaded to user computers via a network.

Each computer stores the program in its local storage unit, which has previously been installed from a portable storage medium or downloaded from a server computer. The computer performs intended functions by executing the program read out of the local storage unit. As an alternative way of program execution, the computer may execute the program, reading out program files directly from a portable storage medium. Another alternative method is that the computer dynamically downloads the program from a server computer when they are demanded and executes them upon delivery.

As described above, in this invention, an ongoing scenario is detected with key data as search keys, and the execution of the process indicated by a packet after the detected ongoing scenario is compared with unauthorized access scenarios. Therefore, all ongoing scenarios does not necessarily have to be checked, thus making it possible to detect unauthorized accesses which are made through preparation, in real time.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An unauthorized access detection device for detecting unauthorized accesses over a network, comprising:

unauthorized access scenario storage means for storing unauthorized access scenarios each defining a procedure of processes to be executed over the network until an unauthorized access is made through preparation;

ongoing scenario storage means for storing ongoing scenarios by relating the ongoing scenarios to key data, the ongoing scenarios each indicating progress of processes executed over the network based on one of the unauthorized access scenarios, the key data differentiating processes associated with each of the ongoing scenarios from other processes;

key data extraction means for obtaining a packet traveling on the network and extracting the key data from the packet obtained;

ongoing scenario detection means for retrieving an ongoing scenario from the ongoing scenario storage means with the key data extracted by the key data extraction means as a search key;

check means for determining whether execution of a process indicated by the packet after the ongoing scenario retrieved by the ongoing scenario detection means follows one of the unauthorized access scenarios being stored in the unauthorized access scenario storage means;

ongoing scenario update means for updating the ongoing scenario being stored in the ongoing scenario storage means when a check result of the check means shows that the execution follows the one of the unauthorized access scenarios; and report output means for outputting an unauthorized access report showing progress of processes executed based on the one of the unauthorized access scenarios, depending on the check result of the check means.

2. The unauthorized access detection device according to claim 1, wherein the report output means outputs the unauthorized access report when the ongoing scenario retrieved by the ongoing scenario detection means reaches a final stage of the one of the unauthorized access scenarios.

3. The unauthorized access detection device according to claim 1, wherein:

the ongoing scenario storage means stores a numeric value by relating the numeric value to the each of the ongoing scenarios, the numeric value indicating a degree of progress of the each of the ongoing scenarios; and the ongoing scenario update means updates the ongoing scenario by increasing the numeric value of the degree of progress.

4. The unauthorized access detection device according to claim 3, wherein the report output means outputs the unauthorized access report when the degree of progress exceeds a prescribed value.

5. The unauthorized access detection device according to claim 1, wherein:

in the unauthorized access scenario storage means, roles are set to a source and a destination of information indicating a process to be executed over the network, in each of the unauthorized access scenarios; and the check means determines whether a source and a destination of the process indicated by the packet take the roles defined in the one of the unauthorized access scenarios.

6. The unauthorized access detection device according to claim 1, wherein:

a procedure of processes until an unauthorized access is made through preparation is defined in the form of state transitions with events as turning points in each of the unauthorized access scenarios being stored in the unauthorized access scenario storage means, the events generated at a time of instructions and responses of processes executed over the network; and the check means determines whether a state transition to an event of the process indicated by the packet follows the one of the unauthorized access scenarios.

7. The unauthorized access detection device according to claim 1, wherein:

valid periods for proceeding processes to next stages are set in each of the unauthorized access scenarios being stored in the unauthorized access scenario storage means; and the check means determines whether the process indicated by the packet is executed within the valid period.

8. The unauthorized access detection device according to claim 1, wherein:

weights to be added every time when a scenario progresses are defined in each of the unauthorized access scenarios being stored in the unauthorized access scenario storage means; and the report output means outputs the unauthorized access report when a total weight exceeds a prescribed value.

9. An unauthorized access detection method for detecting unauthorized accesses over a network, comprising the steps of:

obtaining a packet traveling on the network and extracting prescribed key data from the packet obtained;

retrieving an ongoing scenario from ongoing scenario storage means with the key data extracted from the packet as a search key, the ongoing scenario indicating progress of processes executed over the network based on an unauthorized access scenario, the unauthorized access scenario defining a procedure of processes to be executed over the network until an unauthorized access is made through preparation, the key data differentiating processes associated with the ongoing scenario from other processes;

checking unauthorized access scenario storage means storing the unauthorized access scenario to determine whether execution of a process indicated by the packet after the ongoing scenario retrieved follows the unauthorized access scenario;

updating the ongoing scenario being stored in the ongoing scenario storage mans when a check result shows that the execution follows the unauthorized access scenario; and outputting an unauthorized access report indicating progress of processes executed based on the unauthorized access scenario, depending on the check result.

10. An unauthorized access detection program to detect unauthorized accesses over a network, the unauthorized access detection program causing a computer to function as:

unauthorized access scenario storage means for storing unauthorized access scenarios each defining a procedure of processes to be executed over the network until an unauthorized access is made through preparations;

ongoing scenario storage means for storing ongoing scenarios by relating the ongoing scenarios to key data, the ongoing scenarios each indicating progress of processes executed over the network based on one of the unauthorized access scenarios, the key data differentiating processes associated with each of the ongoing scenarios from other processes;

key data extraction means for obtaining a packet traveling on the network and extracting the key data from the packet obtained;

ongoing scenario detection means for retrieving an ongoing scenario from the ongoing scenario storage means with the key data extracted by the key data extraction means as a search key;

check means for determining whether execution of a process indicated by the packet after the ongoing scenario retrieved by the ongoing scenario detection means follows one of the unauthorized access scenarios being stored in the unauthorized access scenario storage means;

ongoing scenario update means for updating the ongoing scenario being stored in the ongoing scenario storage means when a check result of the check means shows that the execution follows the one of the unauthorized access scenarios; and report output means for outputting an unauthorized access report showing progress of processes executed based on the one of the unauthorized access scenarios, depending on the check result of the check means.

11. A computer-readable recording medium storing an unauthorized access detection program to detect unauthorized accesses over a network, the unauthorized access detection program causing a computer to function as:

unauthorized access scenario storage means for storing unauthorized access scenarios each defining a procedure of processes to be executed over the network until an unauthorized access is made through preparation;

ongoing scenario storage means for storing ongoing scenarios by relating the ongoing scenarios to key data, the ongoing scenarios each indicating progress of processes executed over the network based on one of the unauthorized access scenarios the key data differentiating processes associated with each of the ongoing scenarios from other processes;

key data extraction means for obtaining a packet traveling on the network and extracting the key data from the packet obtained;

ongoing scenario detection means for retrieving an ongoing scenario from the ongoing scenario storage means with the key data extracted by the key data extraction means as a search key;

check means for determining whether execution of a process indicated by the packet after the ongoing scenario retrieved by the ongoing scenario detection means follows one of the unauthorized access scenarios being stored in the unauthorized access scenario storage means;

ongoing scenario update means for updating the ongoing scenario being stored in the ongoing scenario storage means when a check result of the check means shows that the execution follows the one of the unauthorized access scenarios; and report output means for outputting an unauthorized access report showing progress of processes executed based on the one of the unauthorized access scenarios, depending on the check result of the check means.

* * * * *